United States Patent
Jin

(10) Patent No.: US 11,509,485 B2
(45) Date of Patent: Nov. 22, 2022

(54) IDENTITY AUTHENTICATION METHOD AND SYSTEM, AND COMPUTING DEVICE

(71) Applicant: Alibaba Group Holding Limited, Grand Cayman (KY)

(72) Inventor: Haifeng Jin, Hangzhou (CN)

(73) Assignee: Alibaba Group Holding Limited, George Town (KY)

(*) Notice: Subject to any disclaimer, the term of this patent is extended or adjusted under 35 U.S.C. 154(b) by 177 days.

(21) Appl. No.: 16/904,398

(22) Filed: Jun. 17, 2020

(65) Prior Publication Data

US 2020/0322170 A1    Oct. 8, 2020

Related U.S. Application Data

(63) Continuation of application No. PCT/CN2018/120073, filed on Dec. 10, 2018.

(30) Foreign Application Priority Data

Dec. 18, 2017    (CN) .......................... 201711366337.4

(51) Int. Cl.
   *H04L 9/32*        (2006.01)
   *H04L 9/08*        (2006.01)
   (Continued)

(52) U.S. Cl.
   CPC .......... *H04L 9/3263* (2013.01); *H04L 9/0869* (2013.01); *H04L 9/3226* (2013.01);
   (Continued)

(58) Field of Classification Search
   None
   See application file for complete search history.

(56) References Cited

U.S. PATENT DOCUMENTS

| 8,112,066 B2 | 2/2012 | Ben Ayed |
| 8,260,262 B2 | 9/2012 | Ben Ayed |

(Continued)

FOREIGN PATENT DOCUMENTS

| CN | 104202744 A | 12/2014 |
| CN | 105100052 A | 11/2015 |

(Continued)

OTHER PUBLICATIONS

Translation of International Search Report for corresponding PCT Application No. PCT/CN2018/120073 dated Jan. 30, 2019, a counterpart foreign application for U.S. Appl. No. 16/904,398, 2 pages.

(Continued)

*Primary Examiner* — Brandon Hoffman
(74) *Attorney, Agent, or Firm* — Lee & Hayes, P.C.

(57) ABSTRACT

Identity authentication method, system, and computing device are disclosed. The method includes: an identity authentication method is provided, which includes: a first device establishing a communication connection with a second device, and obtaining encrypted information through the Internet, where the first device is a device that is allowed to access the Internet, and the second device is a device that is not allowed to access the Internet; the first device encrypting identity information of an account that is logged into the second device by using the encrypted information, and sending the encrypted identity information to the second device; and the first device receiving a verification result that is returned by the second device, wherein the second device verifies the encrypted identity information based on verification information.

20 Claims, 12 Drawing Sheets

(51) Int. Cl.
  *H04L 9/40* (2022.01)
  *H04W 12/06* (2021.01)
(52) U.S. Cl.
  CPC ........ *H04L 9/3247* (2013.01); *H04L 63/0428* (2013.01); *H04L 63/0884* (2013.01); *H04W 12/06* (2013.01)

(56) References Cited

U.S. PATENT DOCUMENTS

| | | | |
|---|---|---|---|
| 8,478,995 | B2 | 7/2013 | Alculumbre |
| 9,717,012 | B2 | 7/2017 | Zakaria et al. |
| 9,860,677 | B1 | 1/2018 | Agerstam et al. |
| 9,866,637 | B2 | 1/2018 | Doraiswamy et al. |
| 10,044,674 | B2 | 8/2018 | Liu et al. |
| 10,379,842 | B2 | 8/2019 | Malladi et al. |
| 10,454,904 | B2 | 10/2019 | Huh et al. |
| 2016/0323283 | A1 | 11/2016 | Kang et al. |
| 2017/0085379 | A1 | 3/2017 | Mandal et al. |
| 2017/0169640 | A1* | 6/2017 | Britt .................. G06F 21/35 |
| 2017/0237717 | A1* | 8/2017 | Starosielsky ........ G06F 21/57 713/176 |
| 2017/0289735 | A1 | 10/2017 | Rajapaksa et al. |
| 2019/0349254 | A1 | 11/2019 | Nolan et al. |

FOREIGN PATENT DOCUMENTS

| | | |
|---|---|---|
| CN | 105450659 A | 3/2016 |
| CN | 105974802 A | 9/2016 |
| CN | 106034028 A | 10/2016 |
| CN | 106211154 A | 12/2016 |
| CN | 106850540 | 6/2017 |
| EP | 3062541 A1 | 8/2016 |
| WO | WO2017087497 A1 | 5/2017 |

OTHER PUBLICATIONS

Translation of Written Opinion for corresponding PCT Application No. PCT/CN2018/120073 dated Jan. 30, 2019, a counterpart foreign application for U.S. Appl. No. 16/904,398, 4 pages.
English translation of Chinese Office Action dated Aug. 23, 2021, from corresponding CN Patent Application No. 201711366337.4, 17 pages.
English translation of Chinese Supplementary Search Report dated Aug. 17, 2021, from corresponding CN Patent Application No. 201711366337.4, 2 pages.
English translation of Chinese Office Action dated Feb. 9, 2021, from corresponding CN Patent Application No. 201711366337.4, 20 pages.
English translation of Chinese Office Action dated Feb. 9, 2022, from corresponding CN Patent Application No. 201711366337.4, 10 pages.
European Office Action dated Apr. 7, 2022 for European Patent Application No. 18890601.0, a foreign counterpart to U.S. Appl. No. 16/904,398, 5 pages.
Extended European Search Report dated Aug. 9, 2021 for European Patent Application No. 18890601.0, 8 pages.
Ouvrier, et al., "Characterizing the HTTPS Trust Landscape: A Passive View from the Edge", Traffic Measurements for Cyber Security, IEEE Communications Magazine, Jul. 17, 2017, pp. 36-42.

* cited by examiner

IDENTITY AUTHENTICATION METHOD AND SYSTEM, AND COMPUTING DEVICE

CROSS REFERENCE TO RELATED PATENT APPLICATIONS

This application claims priority to and is a continuation of PCT Patent Application No. PCT/CN2018/120073 filed on 10 Dec. 2018, and is related to and claims priority to Chinese Application No. 201711366337.4, filed on 18 Dec. 2017 and entitled "Identity Authentication Method and System, and Computing Device," which are hereby incorporated by reference in their entirety.

TECHNICAL FIELD

The present disclosure relates to the field of the Internet of Things, and in particular, to identity authentication methods, systems, and computing devices.

BACKGROUND

With the development of information technology, the Internet of Things has gradually developed into a system that integrates information collection, transmission and processing, and is widely used in all walks of life, which can shorten many business links and reduce mechanical labor. In an Internet of Things system, data is collected by an Internet of Things edge device, and is sent to a server for processing and analysis. The server then issues an operation command, which is executed by the edge device. Since a large amount of raw data needs to be sent to the server for analysis and processing, requirements for network bandwidth and storage capacity are very high. At the same time, such large amount of raw data brings a large processing load to the server, which is prone to delay and network instability. Therefore, it is unrealistic to connect all Internet of Things devices to the Internet to communicate with the server. Edge computing is a technology developed based on thereupon. For the Internet of Things, edge computing implements device controls through local devices, thus greatly improving the processing efficiency and reducing the processing load of servers.

At present, in the Internet of Things edge computing, many devices cannot communicate with a server. Therefore, these devices cannot be operated through the server, and can only be operated by establishing a LAN environment. For example, through an installation of a client terminal and a device component LAN to operate devices, it is necessary to authenticate various applications that can operate the devices to ensure the security of the Internet of Things devices and the normal use of the functions. After a user buys an Internet of Things device, the user only needs to download a relevant client program to control the device. For example, after a user installs a camera used for home monitoring, a control application of the camera can be downloaded through a mobile phone in order to check the situations at home. However, such a method is prone to cracking and obtaining an IP address by an illegal person to connect to the camera in a user's home, and thus check situations in the user's home. Therefore, in order to ensure the security of an Internet of Things device, not every client that can connect to the device has the right to operate the device. Since a device at the edge of the Internet of Things does not have networking conditions, it is impossible to authenticate a client that is used to operate the device without an ability of accessing the Internet, thus posing a security risk.

In the above existing technologies, in a process of operating a non-networked device by a networked device, the non-networked device cannot connect to an authentication server, resulting in a problem that the networked device accessing the non-networked device cannot complete an identity authentication. Currently, no effective solution has been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present invention provide a method, a system, and a computing device for identity authentication, to solve at least the problem of failing to complete an identity authentication for a networked device that accesses a non-networked device due to a failure of the non-networked device to connect to an authentication server during a process of operating the non-networked device by the networked device under the existing technologies.

According to the embodiments of the present invention, an identity authentication method is provided, which includes: a first device establishing a communication connection with a second device, and obtaining encrypted information through the Internet, where the first device is a device that is allowed to access the Internet, and the second device is a device that is not allowed to access the Internet; the first device encrypting identity information of an account that is logged into the second device by using the encrypted information, and sending the encrypted identity information to the second device; and the first device receiving a verification result that is returned by the second device, wherein the second device verifies the encrypted identity information based on verification information.

According to the embodiments of the present invention, an identity authentication method is further provided, which includes: a second device establishing a communication connection with the first device, and receiving identity information to be verified that is sent by the first device, wherein the first device is a device that is allowed to access the Internet, and the second device is a device that is not allowed to access the Internet; and the second device verifying the identity information to be verified that is sent by the first device based on verification information, and obtaining a verification result, wherein the identity information to be verified is data that is encrypted using encrypted information.

According to the embodiments of the present invention, an identity authentication method is further provided, which includes: a second device receiving identity information to be verified that is sent from a first device, wherein the first device is a device that is allowed to access the Internet, and the second device is a device that is not allowed to access the Internet; the second device verifying the identity information to be verified according to verification information, and obtaining a verification result; and generating a shared key used for encrypting and decrypting data in response to the verification result indicating that the identity information is trusted, wherein the shared key is used for ensuring secure data transmission between the first device and the second device, and the identity information to be verified is data encrypted by using encrypted information.

According to the embodiments of the present invention, an identity authentication system is further provided, which includes: a first device that is configured to obtain encrypted information through the Internet, encrypt identity information of an account that is logged into a second device by using the encrypted information, and sending the encrypted identity information to the second device; the second device that establishes a communication connection with the first device, and is configured to verify the encrypted identity information based on verification information, obtain a verification result, and return the verification result to the first device, wherein the first device is a device that is allowed to access the Internet, and the second device is a device that is not allowed to access the Internet.

According to the embodiments of the present invention, a computing device is further provided, which includes: a communication apparatus, which establishes a communication connection with a control device, and is configured to receive identity information to be verified that is sent from the control device, wherein the control device a device that is allowed to access the Internet; and a processor which is connected to the communication device, and is configured to obtain a verification result by verifying the identity information to be verified that is sent from the control device based on verification information, and generate a shared key for data encryption and decryption if the verification result indicates that the identity information is trusted, wherein the shared key is used for ensuring secure data transmission between the communication device and the control device.

According to the embodiments of the present invention, a storage medium is also provided. The storage medium includes a stored program, wherein a device in which the storage medium is located is controlled to perform any one of the above identity authentication methods when the program is executed.

According to the embodiments of the present invention, a computing terminal is also provided, which includes: a processor configured to execute a program, wherein the program performs any one of the above identity authentication methods when being executed.

According to another aspect of the embodiments of the present invention, an identity authentication system is also provided, which includes: a processor; and a memory coupled to the processor and configured to provide an instruction to the processor to process the following processing steps: a first device establishing a communication connection with a second device and obtaining encrypted information through the Internet, wherein the first device is a device that is allowed to access the Internet, and the second device is a device that is not allowed to access the Internet; the first device encrypting identity information of an account that is logged into the second device using the encrypted information, and sending the encrypted identity information to the second device; and the first device receiving a verification result that is returned by the second device, wherein the second device verifies the encrypted identity information based on verification information.

In the embodiments of the present invention, a communication connection is established between a first device and a second device, and encrypted information is obtained through the Internet, wherein the first device is a device that is allowed to access the Internet, and the second device is a device that is not allowed to access the Internet. The first device encrypts identity information of an account that is logged into the second device using the encrypted information, and sends the encrypted identity information to the second device. The first device receives a verification result returned by the second device, wherein the second device verifies the encrypted identity information based on verification information. The purpose of verifying identity information of an object that is used for operating a non-networked device according to verification information built into the non-networked device is achieved. As such, a technical effect of authenticating an identity of a client by a non-networked device to improve the security of data transmission between the client and the non-networked device when the client is used to operate the non-networked device, thereby solving the problem of a networked device accessing a non-networked device failing to complete an identity authentication due to a failure of the non-networked device to connect to an authentication server during a process of operating the non-networked device by the networked device under the existing technologies.

BRIEF DESCRIPTION OF THE DRAWINGS

The drawings described herein are intended to provide a further understanding of the present disclosure, and are intended to form as a portion of the present disclosure. The illustrative embodiments and a description thereof are used for explaining the present disclosure, and are not to be construed as improper limitations to the present disclosure. In the drawing.

DETAILED DESCRIPTION

Figure 1:
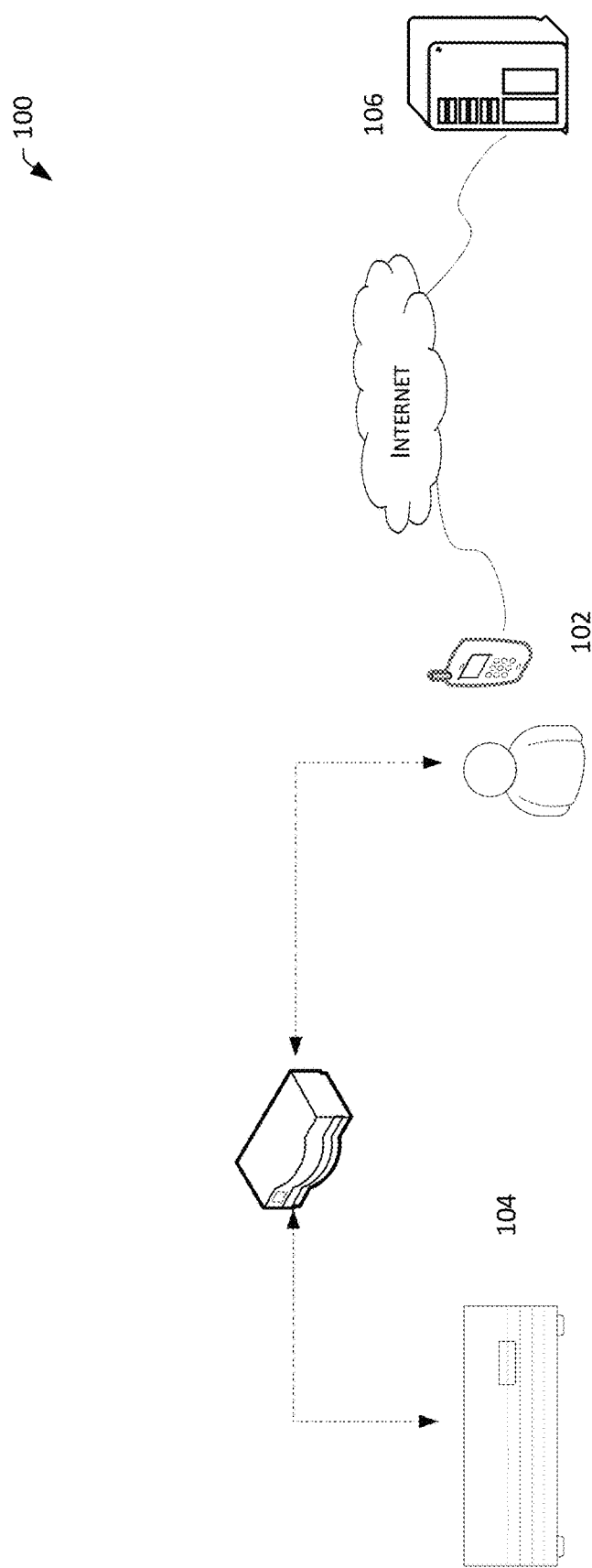
FIG. 1 is a schematic diagram of an exemplary identity authentication system according to the embodiments of the present disclosure.

In order to enable one skilled in the art to better understand the solutions of the present disclosure, the technical solutions in the embodiments of the present disclosure are clearly and completely described hereinafter with reference to the accompanying drawings in the embodiments of the present disclosure. Apparently, the described embodiments merely represent some and not all of the embodiments of the present disclosure. Based on the embodiments of the present disclosure, all other embodiments obtained by one of ordinary skill in the art without making any inventive effort shall fall within the scope of protection of the present disclosure.

It should be noted that terms such as "first", "second", and the like in the specification, and drawings of the present disclosure are used to distinguish similar objects, and are not necessarily used to describe a specific sequence or order. It is understood that the data so used may be interchanged whenever appropriate, so that the embodiments of the present disclosure described herein can be implemented in an order other than those illustrated or described herein. In addition, terms "including", "consisting of", and their variations are intended to cover a non-exclusive inclusion. For example, a process, method, system, product, or device that includes a series of steps or units is not necessarily limited to such steps or units, and may include other steps or units not explicitly listed or that are inherent to such process, method, product, or device.

First, some of the nouns or terms that appear in a process of describing the embodiments of the present disclosure are applicable to the following explanations:

An Internet of Things refers to a huge network that is formed by combining the Internet with various types of information that are needed, such as objects or processes that are needed to be monitored, connected, and interacted with, etc., through various types of information sensing devices.

Edge computing refers to an open platform that uses networking, computing, storage, and application core capabilities on a side of an object or a data source and provides nearest end services. Its application program is launched on the edge, resulting in a faster network service response, and satisfying basic requirements such as aspects of real-time transactions, application intelligence, security, and privacy protection, etc. The Internet of Things edge computing enables controls of Internet of Things devices to be performed through local devices, thereby reducing the processing load on servers and improving the processing efficiency.

A first device may be a device connected to the Internet and have access the Internet, which includes but is not limited to, a device that is installed with an application program used for controlling or operating various Internet of Things infrastructure devices in Internet of Things edge computing.

A second device may be a non-networked device, i.e., a device that is not connected to the Internet. In implementations, the second device may be a variety of Internet of Things infrastructure devices that are not connected to the Internet in the Internet of Things edge computing.

According to the embodiments of the present disclosure, an embodiment of an identity authentication system is provided, which can be applied to identity authentication of an operation object of any type of non-networked device.

In implementations, the embodiment may be applied to a client or a web-based application that is used for operating an Internet of Things edge device in an Internet of Things edge computing, wherein the client or the web-based application is installed on a networked device (which includes, but is not limited to a mobile phone, a laptop, a tablet computer, a computing device, etc.), and a networked device can communicate with a server.

Since a large number of Internet of Things infrastructure devices (for example, smart lights, smart air conditioners, etc.) in the Internet of Things edge computing are unable to communicate with a server, client application programs installed on networked devices (e.g., mobile phones) or Internet of Things web applications that are based on Web are used to operate the Internet of Things infrastructure devices.

When using a client application installed on a networked device or a web-based application to access an Internet of Things infrastructure device and operate the Internet of Things infrastructure device, a first type of method in the existing technologies is to directly log into this client application or web-based application to operate the Internet of Things infrastructure device. The Internet of Things infrastructure device does not authenticate the application that accesses or operates the Internet of Things infrastructure device, and data transmission is a plaintext transmission with low security. A second type of method is to have an Internet of Things infrastructure device to directly access a server, with the server sending a trusted list. When a client application or a web-based application is connected to the Internet of Things infrastructure device, the device determines whether the current application is in the trusted list, and then determines whether to provide or deny a service.

As can be seen from above, in the above first type of method, a security risk exists when an application is used to directly operate an Internet of Things infrastructure device without performing authentication on the application. In the second type of method, a device communicates with a server, and a large number of devices are likely to cause an increase in the processing load of the server.

Under the above circumstances, the inventors have found through studies that if an identity authentication solution can be provided and applied to a device that is not connected to the Internet (i.e., cannot communicate with a server) to perform authentication on an identity of an object that operates the device, the security is improved by performing authentication on applications that operate non-networked devices, without increasing the processing load on the server.

In implementations, FIG. 1 is a schematic diagram of an exemplary identity authentication system 100 according to the embodiments of the present disclosure. As shown in FIG. 1, the system 100 includes: a first device 102 and a second device 104. The first device is a device that is allowed to access the Internet, and the second device is a device that is not allowed to access the Internet. In other words, the first device can communicate with a server, and the second device cannot communicate with the server. It should be noted that the second device may not communicate with the server, which may include, but is not limited to the following two situations: (1) the second device itself has no networking capabilities (for example, a variety of Internet of Things infrastructure devices in the Internet of Things edge computing), and is not able to communicate with a server; and (2) the second device has networking capabilities, but does not have the right to access the server (for example, in order to prevent a problem of excessive service processing load caused by a large number of devices accessing the server, some devices are not allowed to access the server).

The first device 102 is configured to obtain encrypted information through the Internet, encrypt identity information of an account that is logged in to the second device using the encrypted information, and send the encrypted identity information to the second device.

Specifically, the first device may be any terminal device capable of accessing the Internet, including but not limited to a mobile phone, a notebook computer, a tablet computer, a computer, etc. The second device may be a device that is capable of accessing the Internet, or may be a device that is not capable of accessing the Internet. The identity authentication method provided by the embodiments of the present disclosure is mainly applied in a second device that is not connected to the Internet or cannot communicate with a server, which includes, but is not limited to any type of Internet of Things edge device (or infrastructure device). The encrypted information may be key information used for encrypting identity information sent by the first device to the second device. It is easy to note that different encryption information is obtained using different encryption algorithms.

For example, when a symmetric encryption algorithm is used, the encrypted information may be a key used for encrypting identity information. A sender (the first device 102) encrypts the identity information using the encrypted information, and a recipient (the second device 104) decrypts the identity information using the key. When an asymmetric encryption algorithm is used, the encrypted information may include a private key that encrypts identity information and a public key that decrypts the encrypted identity information. A sender (the first device 102) encrypts the identity information using the private key, and a recipient (the second device 104) decrypts the identity information using the public key corresponding to the private key.

It should be noted that applications installed on the first device include, but are not limited to, applications of any one of the following operating systems: Windows, iOS, Android, etc. The applications installed on the first device may be client application programs or some web-based applications that need to be accessed through a browser installed on the first device. A user can operate the second device through these applications installed in the first device.

The second device 104 establishes a communication connection with the first device, and is configured to verify the encrypted identity information based on verification information to obtain a verification result, and return the verification result to the first device.

In implementations, since the second device is not connected to the Internet, or is unable to communicate with a corresponding server, some information used for verifying an identity of an operating object may be built into the second device when being shipped from a manufacturer in order to authenticate the identity of the object that operates the second device. As such, when the first device establishes a communication connection with the second device, the second device may perform verification on identity information of the first device through verification information that is built in.

In implementations, the verification information may be a root certificate of a server certificate issuing platform, and the certificate issuing platform may be a platform used by a server to issue a digital certificate to the first device.

In implementations, the first device 102 can establish a communication connection with the second device 104 using any one of the following communication modes: a transmission control protocol (TCP), a user datagram protocol (UDP), Bluetooth, Zigbee, and WiFi.

In implementations, as shown in FIG. 1, the system 100 may further include a server 106, in communication with the first device 102. The server 106 receives a login request initiated by the first device 102, and generates encrypted information according to the login request. The encrypted information includes at least one of: a key pair and a digital certificate. The key pair includes a private key and a public key, used for performing asymmetric encryption on identity information sent by the first device to the second device. Specifically, the first device encrypts the identity information that is sent to the first device using the private key. The second device decrypts the received encrypted identity information using the public key corresponding to the private key. In implementations, the above digital certificate may be used to transmit the public key.

Figure 2:
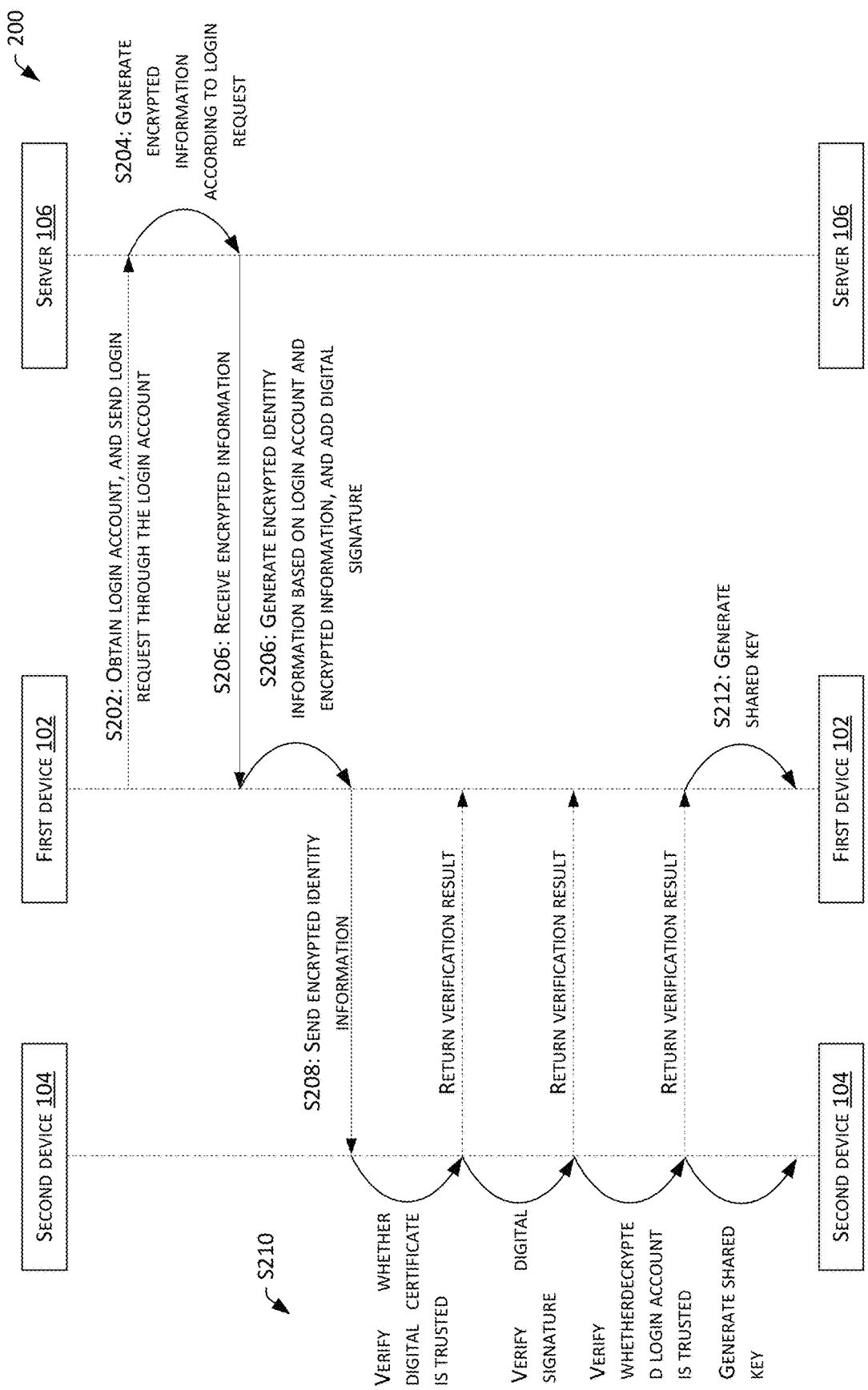
FIG. 2 is a schematic interaction diagram of an exemplary identity authentication system according to the embodiments of the present disclosure.

FIG. 2 is a schematic interaction diagram of an exemplary identity authentication system 200 according to the embodiments of the present disclosure. As shown in FIG. 2, an interaction process among the first device 102, the second device 104, and the server 106 is as follows:

S202: The first device 102 obtains a login account, and sends a login request to the server 106 via the login account.

S204: The server 106 generates corresponding encrypted information according to the login request of the first device, wherein the encrypted information includes at least one of the following: a key pair and a digital certificate.

It should be noted that the server 106 may generate the corresponding encryption information according to the login account of the first device in the login request. In implementations, the server 106 may further generate a user account (also referred to as a using account, which acts as an account for the first device to use the second device) corresponding to the login account according to the login account of the first device in the login request, and the corresponding encrypted information. In implementations, the server 106 can also grant different usage rights for different user accounts.

It is easy to note that since the user account and the login account are in one-to-one correspondence, the login account of the first device can be directly used as an account for operating or using the second device, or a special user account can be generated. The present disclosure does not have any limitations thereon, as long as it can be used to identify the identity information of the first device, which is within the scope of the protection of the present disclosure.

S206: After receiving the encrypted information returned by the server 106, the first device 102 generates encrypted identity information based on the login account and the encrypted information.

Specifically, the first device 102 may encrypt the login account and/or a random number using the private key in the key pair to obtain an encryption result, and generate the encrypted identity information based on the login account and information of at least one of the following: the encryption result and a digital certificate. Implementations thereof include, but are not limited to the following three types:

In a first implementation, the first device 102 encrypts the login account by using the private key in the key pair returned by the server 106 to obtain an encryption result, and generates encrypted identity information based on the encryption result and the digital certificate. The digital certificate can be used to transmit the public key corresponding to the private key.

In a second implementation, the first device 102 encrypts the login account and a random number (assumed to be a first random number) using the private key in the key pair that is returned by the server 106 to obtain an encryption result, and generates encrypted identity information based on the encryption result and the digital certificate. The digital certificate can be used to transmit the public key corresponding to the private key.

In a third implementation, the first device 102 encrypts a random number (assumed to be a first random number) using the private key in the key pair that is returned by the server 106 to obtain an encryption result, and generates encrypted identity information based on the login account of the first device, the encryption result, and the digital certificate. The digital certificate can be used to transmit the public key corresponding to the private key.

S208: The first device 102 sends the encrypted identity information to the second device 104.

In implementations, after the encrypted identity information is generated by using any one of the exemplary implementations of (3), the digital signature of the first device may be added to the encrypted identity information that is generated, and the digital signature is added. The identity information with the added digital signature is sent to the second device 104.

S210: After receiving the encrypted identity information that is sent by the first device 102, the second device 104 decrypts the encrypted identity information.

Specifically, when decrypting the encrypted identity information, the second device 104 may first determine whether the digital certificate included in the identity information to be verified is trusted based on pre-installed root certificate(s), and return a result of authentication failure to the first device 102 when the digital certificate is not trusted.

Furthermore, when the digital certificate is trusted, the second device 104 extracts the public key included in the digital certificate, and verifies whether the received data has been tampered with using the digital signature. If the received data has been tampered with, the first device receives a result of authentication failure returned by the second device.

Furthermore, when the received data has not been tampered with, the second device 104 decrypts the encryption result using the public key extracted from the digital certificate to obtain the login account and/or the random number (i.e., the first random number), and determines whether the login account exists in a trusted list, wherein the trusted list includes at least one account that is allowed to log into the second device. If the login account does not exist in the trusted list, a result of authentication failure is returned to the first device.

Before determining whether the login account exists in the trusted list, the second device 104 may further determine whether any login account exists in the trusted list. If no login account exists in the trusted list, the second device uses the login account that is obtained from decryption as a management account and adds the login account to the trusted list, wherein the management account is used to manage at least one login account in the trusted list.

In implementations, when the login account exists in the trusted list, the second device 104 generates a random number (i.e., second random data), and generates a shared key based on the first random number and the second random number. The shared key is used to ensure secure data transmission between the first device and the second device.

S212: The first device 102 generates, based on the first random number and the second random number returned by the server, the shared key subsequently used for ensuring secure data transmission between the first device and the second device.

According to the embodiments of the present disclosure, an embodiment of the identity authentication method is also provided, and may be applied to the identity authentication system in the foregoing embodiments, which includes, but is not limited to scenarios in the foregoing embodiments. It should be noted that steps illustrated in a flowchart of the accompanying drawings may be executed in a computer system such as a set of computer executable instructions. Moreover, although a logical order is shown in the flowchart, steps shown or described therein may be performed in an order different than that described herein.

In a process of operating a device through a client terminal, a technical problem that an identity authentication of an already-connected client terminal cannot be completed on the device exists when the device is not networked (i.e., unable to communicate with a server).

Figure 3:
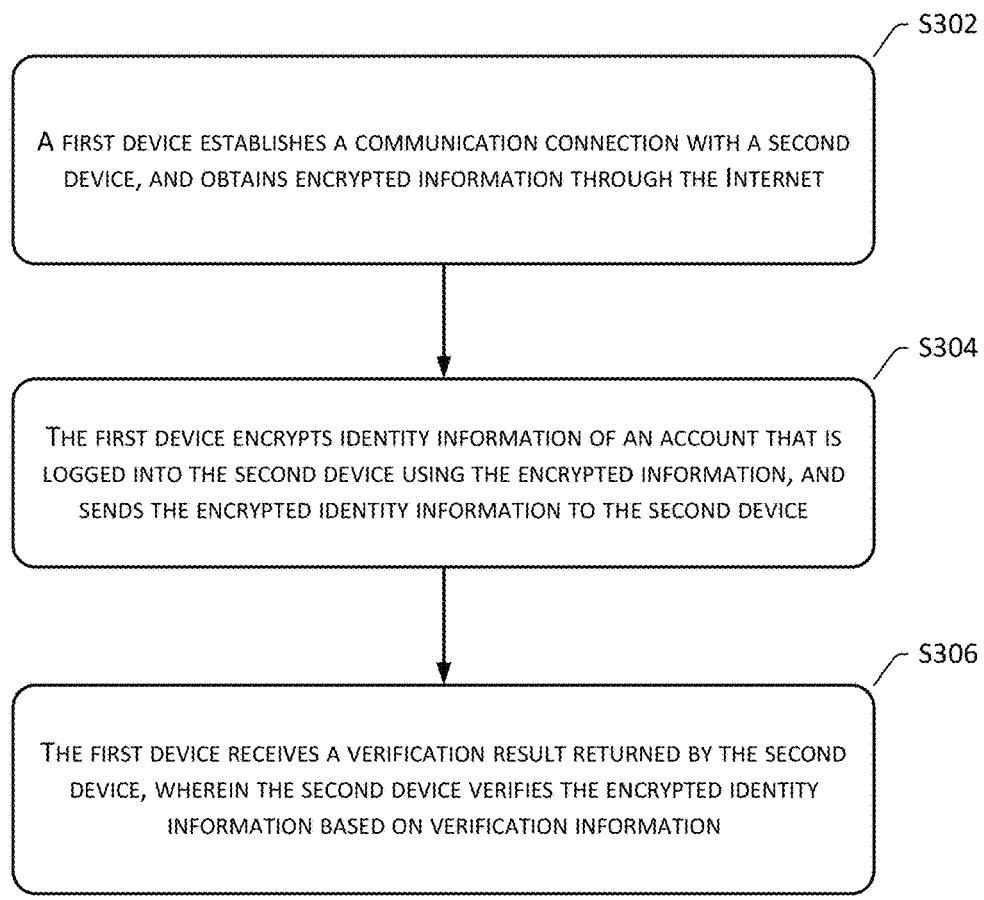
FIG. 3 is a flowchart of an identity authentication method according to the embodiments of the present disclosure.

In order to solve the above problem, the present disclosure provides an embodiment of an identity authentication method. FIG. 3 is a flowchart of an identity authentication method 300 according to the embodiments of the present disclosure. As shown in FIG. 3, the method 300 includes the following steps:

Step S302: A first device establishes a communication connection with a second device, and obtains encrypted information through the Internet, wherein the first device is a device that is allowed to access the Internet, and the second device is a device that is not allowed to access the Internet.

In implementations, the foregoing encryption information may be key information used for encrypting identity information sent by the first device to the second device. The first device may be any terminal device that is capable of accessing the Internet, which includes, but is not limited to a mobile phone, a notebook computer, a tablet computer, a computing device, etc. The second device may be a device that is capable of accessing the Internet, or may be a device that is not capable of accessing the Internet. The identity authentication method provided by the embodiments of the present disclosure is mainly applied to a second device that is not connected to the Internet or cannot communicate with a server, which includes, but is not limited to any one of the Internet of Things edge devices (or infrastructure devices).

In implementations, applications installed on the first device include, but are not limited to, applications of any one of the following operating systems: Windows, iOS, Android, etc. The applications installed on the first device may be client application programs or some web-based applications that need to be accessed through a browser installed on the first device. A user can operate the second device through these applications installed in the first device.

In implementations, the first device can establish a communication connection with the second device 104 using any one of the following communication modes: a transmission control protocol (TCP), a user datagram protocol (UDP), Bluetooth, Zigbee, and WiFi.

It is easy to note that different encryption information is obtained using different encryption algorithms.

In a first implementation, when a symmetric encryption algorithm is adopted, the foregoing encrypted information may be a key used for encrypting identity information, and the first device uses the encrypted information to encrypt the identity information, and the second device uses the key to decrypt the identity information.

In a second implementation, when an asymmetric encryption algorithm is adopted, the foregoing encrypted information may include a private key that encrypts identity information and a public key that decrypts the encrypted identity information. The first device encrypts identity information using the private key, and the second device decrypts the identity information using the public key corresponding to the private key.

Step S304: The first device encrypts identity information of an account that is logged into the second device using the encrypted information, and sends the encrypted identity information to the second device.

In implementations, when the first device establishes a communication connection with the second device, and obtains corresponding encrypted information from the Internet, the encrypted information can be used to encrypt identity information of an account of the first device that is logged into the second device. A method of encryption includes, but is not limited to, the following three types: (1) the first device encrypting the identity information of the first device using the encrypted information to obtain encrypted identity information; (2) the first device encrypting the identity information of the first device and a random number generated by the first device using the encrypted information to obtain encrypted identity information; and (3) the first device encrypting a random number generated by the first device to obtain encrypted identity information based on the identity information of the first device, and using the encrypted information.

Step S306: The first device receives a verification result returned by the second device, wherein the second device verifies the encrypted identity information based on verification information.

In implementations, since the second device is not connected to the Internet, or is unable to communicate with a corresponding server, in order to authenticate an identity of an object operating the second device, some information for verifying an identity of an operation object may be built in the second device when being shipped from a manufacturer. As such, after the first device establishes a communication connection with the second device, the second device verifies received identity information that is sent by the first device based on built-in verification information, and returns a verification result to the first device.

In implementations, the verification information may be a root certificate of a server certificate issuing platform, and the certificate issuing platform may be a platform used by a server to issue a digital certificate to the first device.

As can be seen from above, in the foregoing embodiments of the present disclosure, a first device that is allowed to access the Internet obtains encrypted information from the Internet, and uses the encrypted information to encrypt identity information of an account of the first device that is logged into the second device, so that the second device may verify the received identity information using verification information, and communicate with the first device upon determining that the identity information of the first device is trusted.

It is easy to note that the verification information in the second device can be used to verify the encrypted information obtained by the first device, so that whether the identity of the first device is trusted can be determined according to the verification result. Therefore, through the solutions disclosed in the foregoing embodiments of the present disclosure, the purpose of verifying identity information of an object that is used for operating a non-networked device according to verification information built into the non-networked device is achieved. This thereby achieves a technical effect of improving the security of data transmission between a client and the non-networked device by authenticating an identity of the client by the non-networked device, when the client is used to operate the non-networked device.

Therefore, the solutions of the foregoing embodiments provided by the present disclosure solve the problem of failing to complete an identity authentication for a networked device that accesses a non-networked device due to a failure of the non-networked device to connect to an authentication server during a process of operating the non-networked device by the networked device under the existing technologies.

Figure 4:
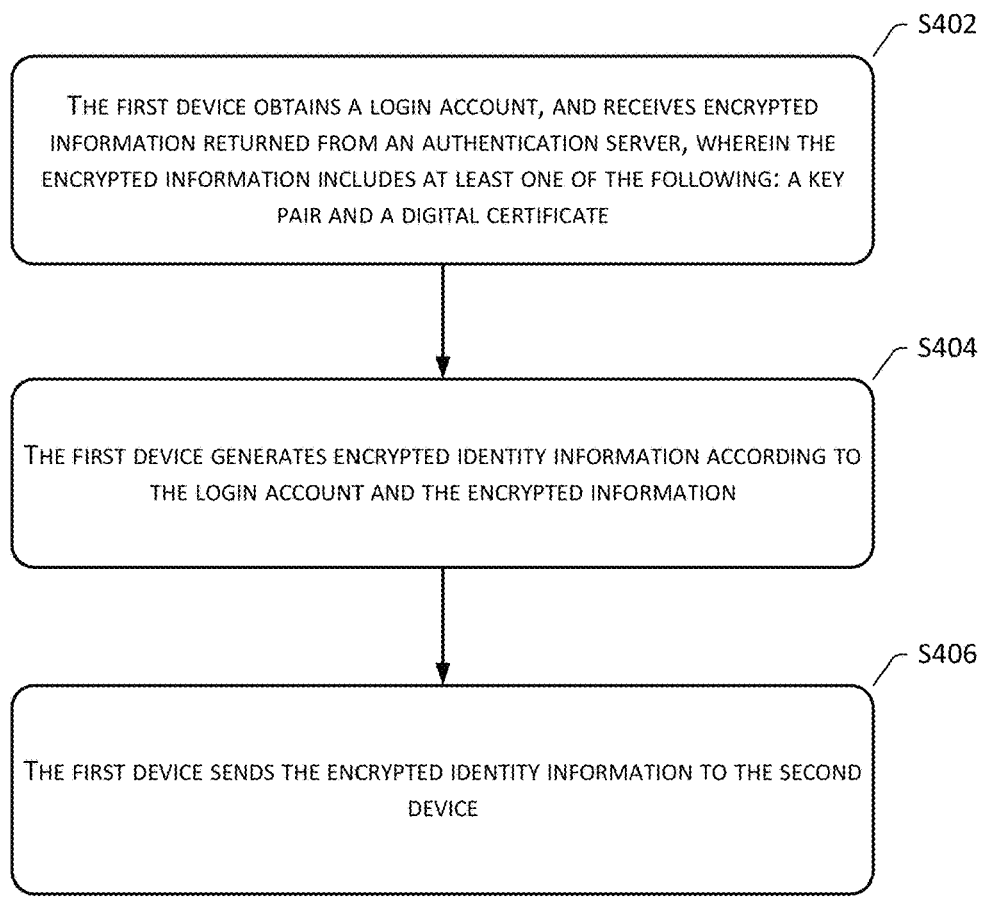
FIG. 4 is a flowchart of an exemplary identity authentication method according the embodiments of the present disclosure.

In implementations, as shown in FIG. 4, in step S304, the first device encrypting the identity information of the account that is logged into the second device using the encrypted information, and sending the encrypted identity information to the second device include:

Step S402: The first device obtains a login account, and receives encrypted information returned from an authentication server, wherein the encrypted information includes at least one of the following: a key pair and a digital certificate.

In implementations, the authentication server may be a server for authenticating an object that operates on the second device. For example, when the second device is an Internet of Things device (such as a smart light, a smart air conditioner, etc.), the authentication server may be a server that provides an application service, and the first device can operate the second device by installing a corresponding application. Since the second device is unable to communicate with the authentication server, in order to verify whether the identity information of the first device operating the second device is trusted, the first device that is capable of communicating with the server (i.e., the authentication server) may log in to the authentication server based on a currently registered or already registered account of the application. As such, the authentication server generates corresponding encryption information, which is used by the first device to encrypt the identity information sent by the first device to the second device.

It should be noted that the key pair in the encrypted information includes: a private key and a public key, and is used for asymmetrically encrypting the identity information sent by the first device to the second device. In implementations, the first device encrypts the identity information that is sent to the second device using the private key. The second device decrypts the received encrypted identity information using the public key corresponding to the private key. In implementations, the digital certificate may be used to transmit the public key.

It is easy to note that the login account is used to represent the identity information of the account of the first device that is logged into the second device, and may be an account that the first device logs into the authentication server, or may be a corresponding user account (also called a using account, which acts as an account of the first device to use the second device) that is generated by the authentication server based on the account that the first device logs into the authentication server.

Since the user account and the login account are in one-to-one correspondence, the login account of the first device can be directly used as an account for operating or using the second device, or a special user account can also be generated. The present disclosure does not have any limitations thereon, as long as it can be used to identify the identity information of the first device, which is within the scope of the protection of the present disclosure.

Step S404: The first device generates encrypted identity information according to the login account and the encrypted information.

In implementations, in a process of generating the encrypted identity information by the first device according to the login account and the encrypted information, the encrypted identity information may be generated by using any one of the following methods: (1) the first device encrypting the login account using the encrypted information to obtain encrypted identity information; (2) the first device encrypting the login account and a random number generated by the first device using the encrypted information to obtain encrypted identity information; and (3) the first device encrypting a random number generated by the first device based on the login account and using the encrypted information to obtain encrypted identity information.

In implementations, when the identity information is encrypted by using an asymmetric encryption algorithm, the obtained private key of the key pair is encrypted, and the step S404 may include: the first device encrypting the login account and/or the random number using the private key in the key pair to obtain an encryption result at step S404-2; and the first device generating the encrypted identity information based on the login account and at least one of the following information: the encryption result and a digital certificate at step S404-4.

For example, at step S404-2, the first device encrypting the login account and/or the random number using the private key in the key pair to obtain the encryption result may include the following steps: the first device obtaining a first random number at step S404-2a; and the first device encrypting the login account and the first random number using the private key in the key pair to obtain the encryption result at step S404-2b.

It is easy to note that in the present disclosure, a specific key pair and a digital certificate are obtained according to the login account of the first device. A specific implementation may have no account, and the certificate of the key pair is obtained by using another medium, which belongs to the scope of protection of the present disclosure.

Step S406: The first device sends the encrypted identity information to the second device.

In implementations, after the first device generates the encrypted identity information according to the login account and the encrypted information that are obtained, the generated encrypted identity information may be added with a digital signature of the first device. The identity information added with the digital signature is sent to the second device.

Through the solutions disclosed in the above steps S402 to S406, the purpose of encrypting and sending identity information to be verified is achieved.

In implementations, before the first device encrypts the identity information of the account that is logged into the second device using the encrypted information, and sends the encrypted identity information to the second device, the method may further include: at step S303, the first device initiating a login request to an authentication server, wherein the authentication server generates the encrypted information according to the login request, the encrypted information includes at least one of the following: a key pair and a digital certificate, and he key pair includes: a private key and a public key configured to asymmetrically encrypt the identity information sent by the first device to the second device. In other words, the first device encrypts the identity information sent to the second device using the private key. The second device decrypts the received encrypted identity information by using the public key corresponding to the private key. In implementations, the above digital certificate may be used to transmit the public key.

Figure 5:
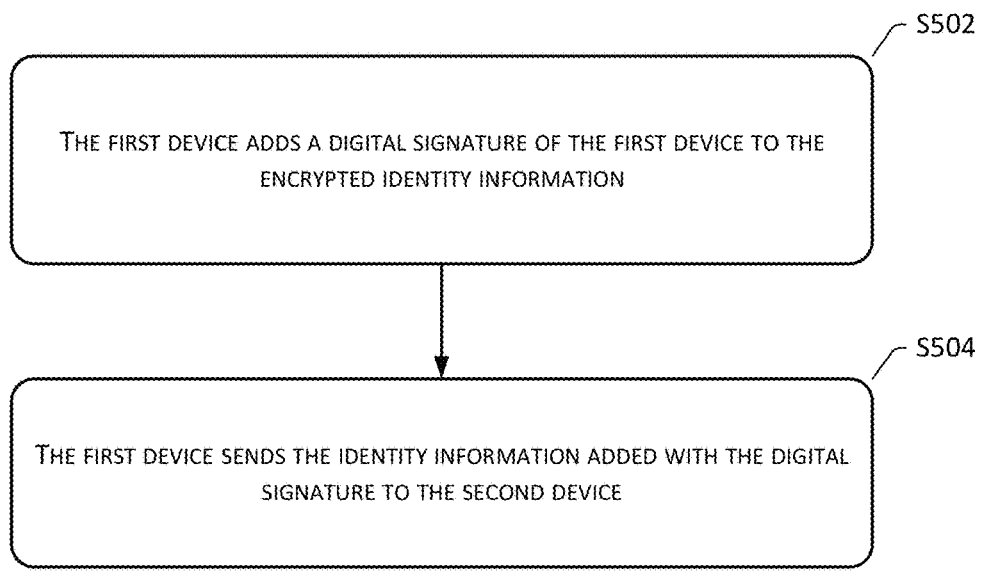
FIG. 5 is a flowchart of an exemplary identity authentication method according to the embodiments of the present disclosure.

It should be noted that, in order to ensure that data received by the second device from the first device has not been tampered with, the first device may add a digital signature of the first device when the encrypted identity information is sent to the second device, and sends the identity information added with the digital signature to the second device. Therefore, in implementations, as shown in FIG. 5, the first device sending the encrypted identity information to the second device may at S406 include the following steps:

Step S502: The first device adds a digital signature of the first device to the encrypted identity information.

Step S504: The first device sends the identity information added with the digital signature to the second device.

Through the solutions disclosed in the foregoing steps S502 to S504, the second device may be used to verify whether the content has been tampered with according to a digital signature protocol after receiving the identity information sent by the first device.

Figure 6:
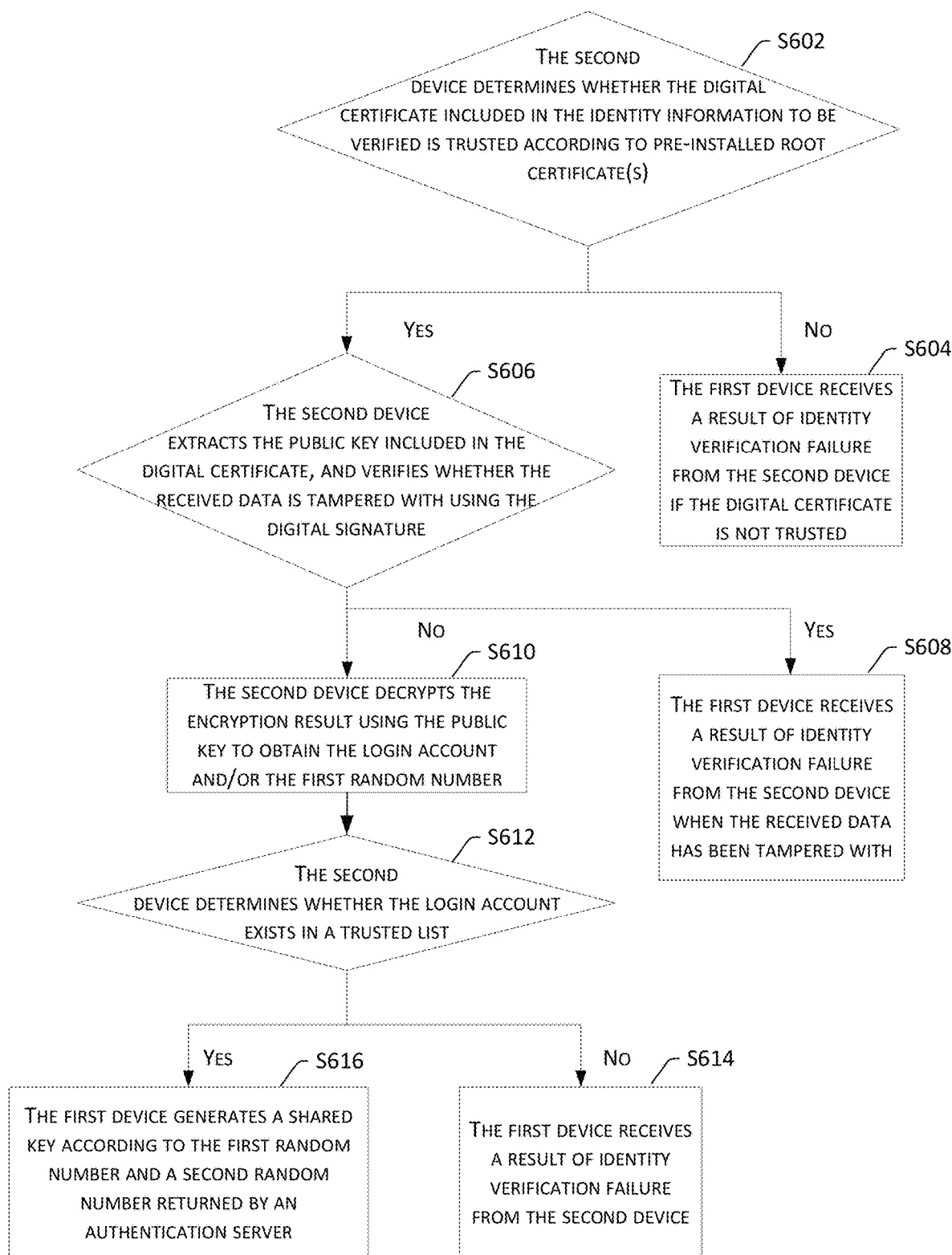
FIG. 6 is a flowchart of an exemplary identity authentication method according to the embodiments of the present disclosure.

Based on the foregoing embodiments, as an exemplary implementation, as shown in FIG. 6, after the first device sends the identity information added with the digital signature to the second device, the method may further include the following steps:

Step S602: The second device determines whether the digital certificate included in the identity information to be verified is trusted according to pre-installed root certificate (s).

In implementations, a root certificate in the second device may be a root certificate of a server certificate issuing platform, and the certificate issuing platform may be a platform used by a server to issue a digital certificate to the first device. The root certificate of the certificate issuing platform can be used to verify whether a digital certificate returned by the certificate issuing platform (i.e., an authentication server) to the first device is trusted.

Step S604: The first device receives a result of identity verification failure from the second device if the digital certificate is not trusted.

In implementations, when the identity information to be verified sent by the first device is determined to be not trusted according to the root certificate(s) pre-installed in the second device, the second device may return a result of identity verification failure.

In implementations, when the digital certificate is trusted, the foregoing method may further include the following steps:

Step S606: The second device extracts the public key included in the digital certificate, and verifies whether the received data is tampered with using the digital signature.

Step S608: The first device receives a result of identity verification failure from the second device when the received data has been tampered with.

Since the identity information to be verified that is sent by the first device and received by the second device is encrypted using the private key of the key pair, the identity information to be verified is decrypted by the public key included in the received digital certificate under a condition that the received digital certificate is determined to be trusted according to the root certificate(s) installed in the second device. In order to avoid unnecessary operations, a verification of whether content in the received data has been tampered with may be first performed based on the digital signature of the first device included in the received data. In case of tampering, a result of authentication failure is returned.

In implementations, when the received data has not been tampered with, the foregoing method may further include the following steps:

Step S610: The second device decrypts the encryption result using the public key to obtain the login account and/or the first random number.

When the content of the identity information received by the second device is not tampered based on the received digital signature and a digital signature protocol, the identity information encrypted by the private key may be decrypted according to the public key extracted from the digital certificate to obtain the identity information of the first device (e.g., the login account), and the random number generated by the first device (i.e., the first random number).

Step S612: The second device determines whether the login account exists in a trusted list, wherein the trusted list includes at least one account that is allowed to log into the second device.

In implementations, the above-mentioned trusted list stores identity information of at least one trusted account (for example, a login account, or a user account generated according to a login account).

In implementations, before determining whether the login account exists in the trusted list, the method may further include the following steps: step S611a, the second device determining whether any login account exists in the trusted list; and step S611b, the second device using the decrypted login account as a management account when no login account exists in the trusted list, and adding the management account into the trusted list, wherein the management account is used to manage at least one login account in the trusted list.

Through the above steps S611a and S611b, the identity information (for example, the login account, or the user account generated according to the login account) that is sent by the first device to the second device for the first time is used as a management account, and is added to a list of trusted accounts. An account corresponding to the management account may delete or add other accounts in the trusted list, thereby solving the problem that the second device needs to be connected to a server to obtain a trusted list, which leads to an excessive processing load of the server.

Step S614: The first device receives a result of identity verification failure from the second device if the login account does not exist in the trusted list. If the decrypted login account is not in the trusted list, the login account is not trusted. Therefore, a result of identity verification failure may be returned to the first device, and operations of the first device to the second device are terminated.

In implementations, when the login account exists in the trusted list, the foregoing method may further include the following steps:

Step S616: The first device generates a shared key according to the first random number and a second random number returned by an authentication server, wherein the second random number is a random number generated by the second device when the login account exists in the trusted list, and the second device generates the shared key according to the first random number and the second random number.

In response to determining that the identity of the first device is trusted, the second device generates a shared key for sending data between the first device and the second device according to the second random number that is generated thereby and the first random number generated by the first device, which can be used for secure data transmission between the first device and the second device subsequently.

Figure 7:
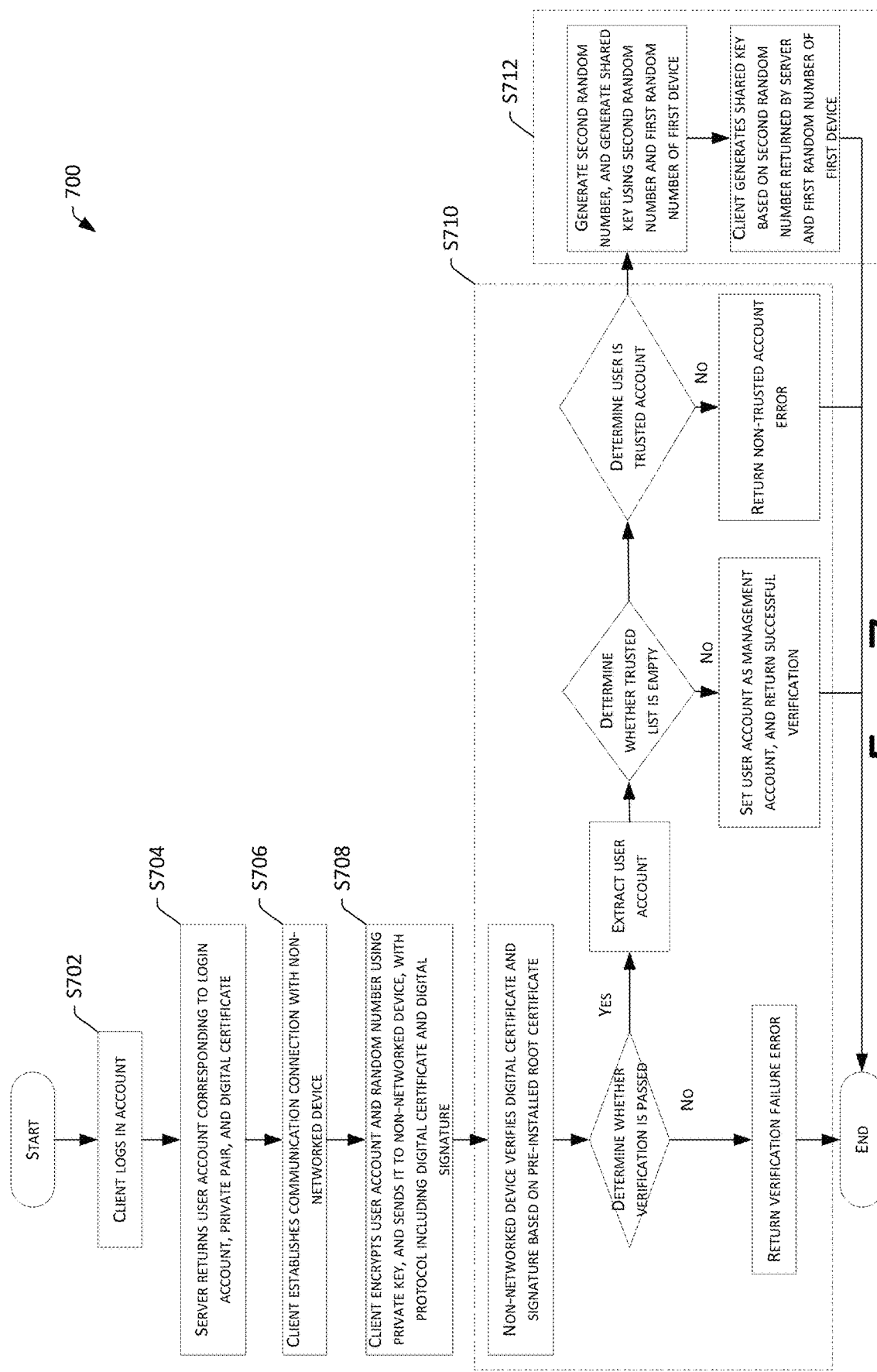
FIG. 7 is a flowchart of an exemplary identity authentication method according to the embodiments of the present disclosure.

In implementations, FIG. 7 is a flowchart of an exemplary identity authentication method 700 according to the embodiments of the present disclosure. As shown in FIG. 7, the method includes the following steps:

S702: A client (that is, the first device mentioned above) logs into an account. In other words, a user logs in through a client program installed by the client device or a web-based application.

S704: A server returns a user account, a key pair, and a digital certificate corresponding to the login account.

Specifically, the server generates a user account and a key pair according to the login account, and issues a digital certificate to the keys through an authorization platform. In implementations, the server can save these pieces of information in the data, so that these pieces of information can be directly read when the login account is logged in next time.

S706: The client establishes a communication connection with a non-networked device (i.e., the second device described above). In implementations, the client connects to the non-networked device via TCP or UDP.

S708: The client encrypts the user account and a random number (i.e., a first random number) using a private key and sends it to the non-networked device, with a protocol including a digital certificate and a digital signature.

S710: The non-networked device verifies the digital certificate and signature according to a root certificate.

Specifically, after receiving data sent from the client, the non-networked device parses the digital certificate, verifies whether the received digital certificate is trusted using the root certificate, and returns an error of authentication failure if the digital certificate is not trusted. If the digital certificate is trusted, a public key is extracted from the digital certificate, and a verification of whether protocol content has been tampered with is performed using a digital signature protocol. If the content has been tampered with, an error of authentication failure is returned.

S712: A shared key is generated.

If the content has not been tampered with, the non-networked device decrypts the user account and the first random number through the public key, and determines whether a trusted list is empty. If the trusted list is empty, the user account is used as a management account. A second random number is generated, and is used with the first random data of the client to generate a shared key for secure data transmission between the client and the non-networked device. The client generates the shared key for secure data transmission between the client and the non-networked device based on the first random number generated thereby and the second random number returned by the server.

Through the solutions disclosed in the foregoing embodiments of the present disclosure, after a first device establishes a communication connection with a second device, a digital certificate sends a public key through sent data that is encrypted by a private key. After a non-networked device verifies that the digital certificate is trusted, identity information of the first device is obtained by decrypting data extracted from the digital certificate using a public key, thereby solving the problem that the non-networked device needs to connect to a server to add a trusted account, and the purpose of identity confirmation and shared key generation is completed in a single communication.

According to the embodiments of the present disclosure, an embodiment of the identity authentication method is also provided. The embodiment may be applied in the identity authentication system in the foregoing embodiments, and include, but is not limited to the scenarios in the foregoing embodiments. It should be noted that steps illustrated in a flowchart of the accompanying drawings may be executed in a computer system such as a set of computer executable instructions. Although a logical order is shown in the flowchart, steps that are shown or described therein may be performed in an order different than the one described herein.

Figure 8:
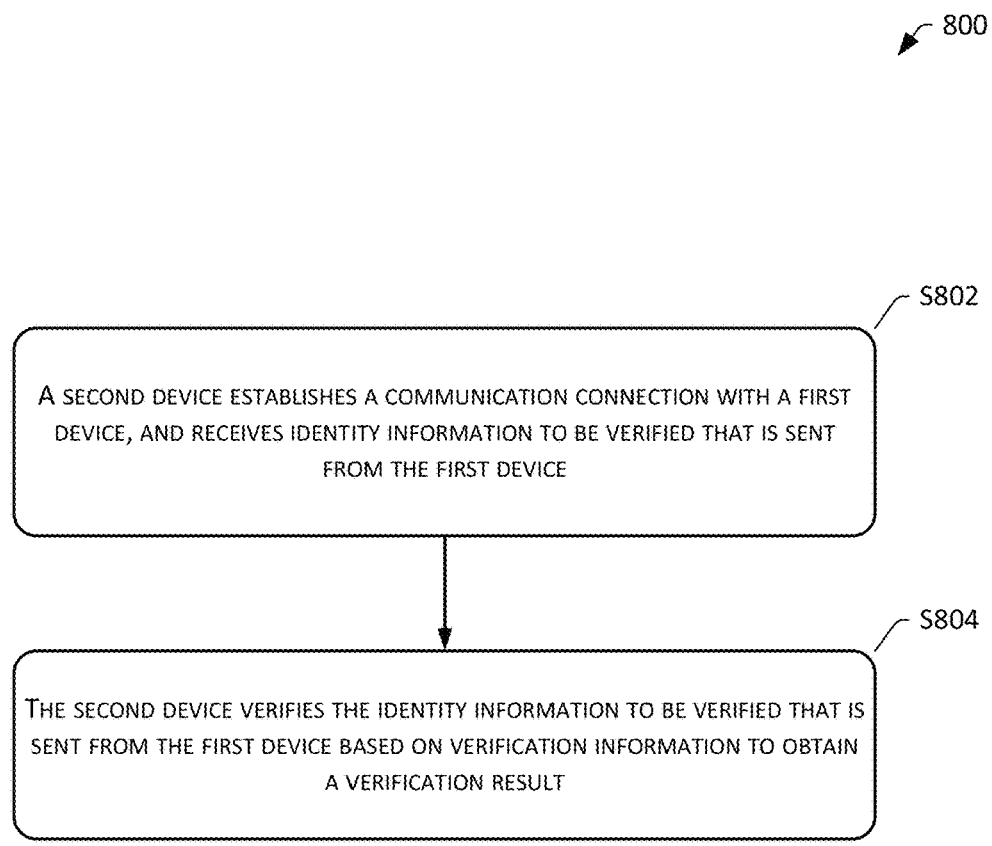
FIG. 8 is a flowchart of an identity authentication method according to the embodiments of the present disclosure.

FIG. 8 is a flowchart of an identity authentication method 800 according to the embodiments of the present disclosure. As shown in FIG. 8, the method 800 includes the following steps:

Step S802: A second device establishes a communication connection with a first device, and receives identity information to be verified that is sent from the first device, wherein the first device is a device that is allowed to access the Internet, and the second device is a device that is not allowed to access the Internet.

It should be noted that the second device may be a device that is capable of accessing the Internet, or may be a device that is not capable of accessing the Internet. The identity authentication method provided by the embodiments of the present disclosure is mainly applied to the second device that is not connected to the Internet or cannot communicate with a server, which includes, but is not limited to, any type of Internet of Things edge devices (or infrastructure devices). The identity information to be verified is data encrypted using encrypted information. The first device may be any terminal device that is capable of accessing the Internet, which includes, but is not limited to, a mobile phone, a laptop, a tablet computer, a computing device, etc.

The second device may establish a communication connection with the first device by using any one of the following communication modes: a transmission control protocol (TCP), a user datagram protocol (UDP), Bluetooth, Zigbee, and WiFi.

Step S804: The second device verifies the identity information to be verified that is sent from the first device based on verification information to obtain a verification result.

In implementations, the verification information may be some information used for verifying an identity of an operation object that may be built into the second device when being shipped from a manufacturer. Since the second device is not connected to the Internet or is unable to communicate with a corresponding server, in order to authenticate an identity of an object that operates the second device, some information used for verifying an identity of an operation object may be built into the second device when being shipped from a manufacturer, so that the second device can perform verification on received identity information that is sent by a first device based on built-in verification information after the first device establishes a communication connection with the second device, and returns a verification result to the first device.

In implementations, the verification information may be a root certificate of a server certificate issuing platform, and the certificate issuing platform may be a platform used by a server to issue a digital certificate to the first device.

As can be seen from above, in the foregoing embodiments of the present disclosure, a second device that is not allowed to access the Internet establishes a communication connection with a first device that is allowed to access the Internet, and receives identity information to be verified that is sent by the first device. The second device uses verification information to verify the identity information of the first device, and conducts communications with the first device only if the identity information of the first device is determined to be trusted.

It is easy to note that the identity information to be verified that is sent by the first device is data encrypted using the encrypted information, and the verification information in the second device can verify the encrypted information acquired by the first device. A determination as to whether the identity of the first device is trusted can be made according to a verification result. Therefore, through the solutions disclosed in the foregoing embodiments of the present disclosure, the purpose of verifying identity information of an object used for operating a non-networked device according to verification information that is built into the non-networked device is achieved. This thereby achieves a technical effect of improving the security of data transmission between a client and the non-networked device by authenticating an identity of the client by the non-networked device, when the client is used to operate the non-networked device.

Therefore, the solutions of the foregoing embodiments provided by the present disclosure solve the problem of failing to complete an identity authentication for a networked device that accesses a non-networked device due to a failure of the non-networked device to connect to an authentication server during a process of operating the non-networked device by the networked device under the existing technologies.

According to the embodiments of the present disclosure, an embodiment of the identity authentication method is also provided. The embodiment may be applied in the identity authentication system in the foregoing embodiments, and include, but is not limited to the scenarios in the foregoing embodiments. It should be noted that steps illustrated in a flowchart of the accompanying drawings may be executed in a computer system such as a set of computer executable instructions. Although a logical order is shown in the flowchart, steps that are shown or described therein may be performed in an order different than the one described herein.

Figure 9:
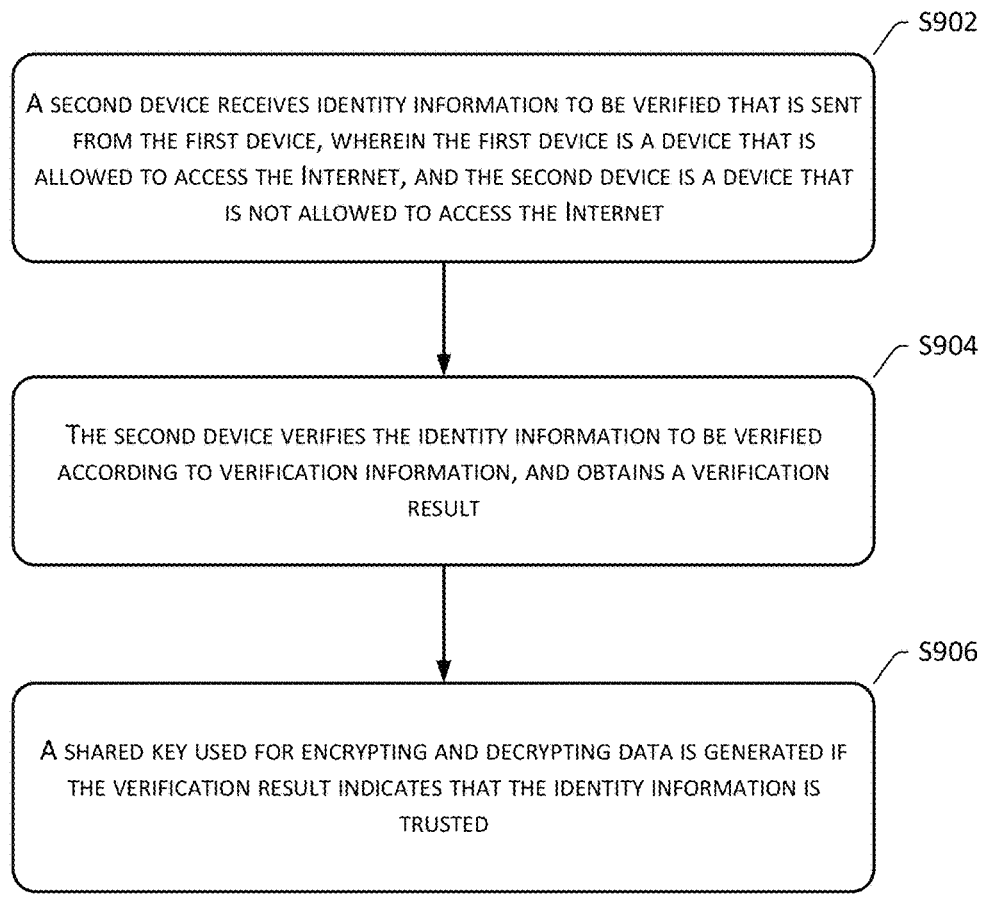
FIG. 9 is a flowchart of an identity authentication method according to the embodiments of the present disclosure.

FIG. 9 is a flowchart of an identity authentication method 900 according to the embodiments of the present disclosure. As shown in FIG. 9, the method 900 includes the following steps:

Step S902: A second device receives identity information to be verified that is sent from the first device, wherein the first device is a device that is allowed to access the Internet, and the second device is a device that is not allowed to access the Internet.

In implementations, the second device may be a device that is capable of accessing the Internet, or may be a device that is not capable of accessing the Internet. The identity authentication method provided by the embodiments of the present disclosure is mainly applied to the second device that is not connected to the Internet or cannot communicate with a server, which includes, but is not limited to, any type of Internet of Things edge devices (or infrastructure devices). The identity information to be verified is data encrypted using encrypted information. The first device may be any terminal device that is capable of accessing the Internet, which includes, but is not limited to, a mobile phone, a laptop, a tablet computer, a computing device, etc.

Step S904: The second device verifies the identity information to be verified according to verification information, and obtains a verification result.

The verification information may be some information used for verification of an identity of an operation object that may be built the second device when being shipped from a manufacturer. In implementations, such verification information may be a root certificate of a server certificate issuing platform. The certificate issuing platform may be a platform used by a server to issue a digital certificate to the first device.

Step S906: A shared key used for encrypting and decrypting data is generated if the verification result indicates that the identity information is trusted, wherein the shared key is used to ensure secure data transmission between the first device and the second device.

In implementations, the shared key may be used for key information for subsequent secure data transmission by the first device and the second device.

As can be seen from above, in the foregoing embodiments of the present disclosure, a second device that is not allowed to access the Internet establishes a communication connection with a first device that is allowed to access the Internet, and receives identity information to be verified that is sent by the first device. The second device uses verification information to determine whether the identity information of the first device is trusted. When determining that the identity information of the first device is trusted, a shared key for conducting communications between the first device and the second device is generated.

It is easy to note that the identity information to be verified that is sent by the first device is data encrypted using the encrypted information, and the verification information in the second device can verify the encrypted information acquired by the first device. A determination of whether the identity of the first device is trusted is made according to a verification result. Therefore, through the solutions disclosed in the foregoing embodiments of the present disclosure, the purpose of verifying identity information of an object used for operating a non-networked device according to verification information that is built into the non-networked device, and the purpose of generating a shared key for secure data transmission when the identity is trusted are achieved. This thereby achieves a technical effect of improving the security of data transmission between a client and the non-networked device by authenticating an identity of the client by the non-networked device, when the client is used to operate the non-networked device.

Therefore, the solutions of the foregoing embodiments provided by the present disclosure solve the problem of failing to complete an identity authentication for a networked device that accesses a non-networked device due to a failure of the non-networked device to connect to an authentication server during a process of operating the non-networked device by the networked device under the existing technologies.

In implementations, before the second device receives the identity information to be verified that is sent by the first device, the method further includes: the first device obtaining a login account, and receiving encrypted information returned by an authentication server, wherein the encrypted information includes at least one of the following: a key pair and a digital certificate; the first device generating the identity information to be verified according to the login account and the encrypted information; and the first device sending the identity information to be verified to the second device.

In implementations, the second device receives the identity information to be verified that is sent by the first device by using any one of the following communication modes: a transmission control protocol (TCP), a user datagram protocol (UDP), Bluetooth, Zigbee, and WiFi.

In implementations, before the first device obtains the login account and receives the encrypted information returned by the authentication server, the method further includes: the first device initiating a login request to the authentication server, wherein the authentication server generates the encrypted information based on the login request.

In implementations, the first device generating the identity information to be verified according to the login account and the encrypted information includes: the first device encrypting the login account and/or the random number using a private key in the key pair to obtain an encryption result; and the first device generating the identity information to be verified based on the login account and information of at least one of the following: the encryption result and the digital certificate.

In implementations, the first device encrypting the login account and/or the random number using the private key in the key pair to obtain the encryption result includes: the first device obtaining a first random number; and the first device encrypting the login account and the first random number using the private key in the key pair to obtain the encryption result.

In implementations, the first device sending the identity information to be verified to the second device may include: the first device adding a digital signature of the first device to the identity information to be verified; and the first device sending the identity information added with the digital certificate to the second device.

In implementations, the second device verifying the identity information to be verified that is sent by the first device according to the verification information and obtaining the verification result may include: the second device determining whether the digital certificate included in the identity to be verified is trusted based on a pre-installed root certificate; and the second device returning a result of authentication failure to the first device if the digital certificate is not trusted.

In implementations, if the digital certificate is trusted, the method further includes: the second device extracting a public key included in the digital certificate when the digital certificate is trusted, and verifying whether received data has been tampered with using the digital signature; and the second device returning a result of authentication failure to the first device if the received data has been tampered with.

In implementations, when the received data has not been tampered with, the method further includes: the second device decrypting the encryption result using the public key to obtain a login account and/or a first random number; and the second device determining whether the login account exists in a trusted list, wherein the trusted list includes at least one account that is allowed to log into the second device; and the second device returning a result of authentication failure to the first device if the login account does not exist in the trusted list.

In implementations, when the login account exists in the trusted list, the second device determines a verification result as the identity information sent by the first device being trusted.

In implementations, after the second device determines the verification result as the identity information that is sent by the first device being trusted, the method further includes: the second device obtaining a second random number, and generating a shared key according to the first random number and the second random number, wherein the first device generates the shared key according to the first random number and the second random number returned by the authentication server.

In implementations, after the second device decrypts the encryption result using the public key to obtain the login account and/or the first random number, the method further includes: the second device determining whether any login account exists in the trusted list; if the second device setting the decrypted login account as a management account and adding the management account to the trusted list no login account exists in the trusted list, wherein the management account is used to manage at least one login account in the trusted list.

It should be noted that the foregoing method embodiments are all expressed as a series of action combinations for the sake of simple description. However, one skilled in the art should understand that the present disclosure is not limited by the described orders of actions, because certain steps may be performed in other orders or in parallel in accordance with the present disclosure. Moreover, one skilled in the art should also understand that the embodiments described in the specification are all exemplary embodiments, and actions and modules involved are not necessarily needed by the present disclosure.

Through the description of the above embodiments, one skilled in the art can clearly understand that the identity authentication methods according to the above embodiments can be implemented by means of software plus a necessary general hardware platform, and apparently can also be implemented through hardware. Nevertheless, in many cases, the former is a better implementation. Based on such understanding, the essence of the technical solutions of the present disclosure, or the portions that make contributions to the existing technologies, may be embodied in a form of a software product. Such computer software product is stored in a storage medium (such as ROM/RAM, a magnetic disk, an optical disk), and includes a number of instructions for causing a terminal device (which may be a mobile phone, a computer, a server, or a network device, etc.) to perform the methods described in various embodiments of the present disclosure.

Figure 10:
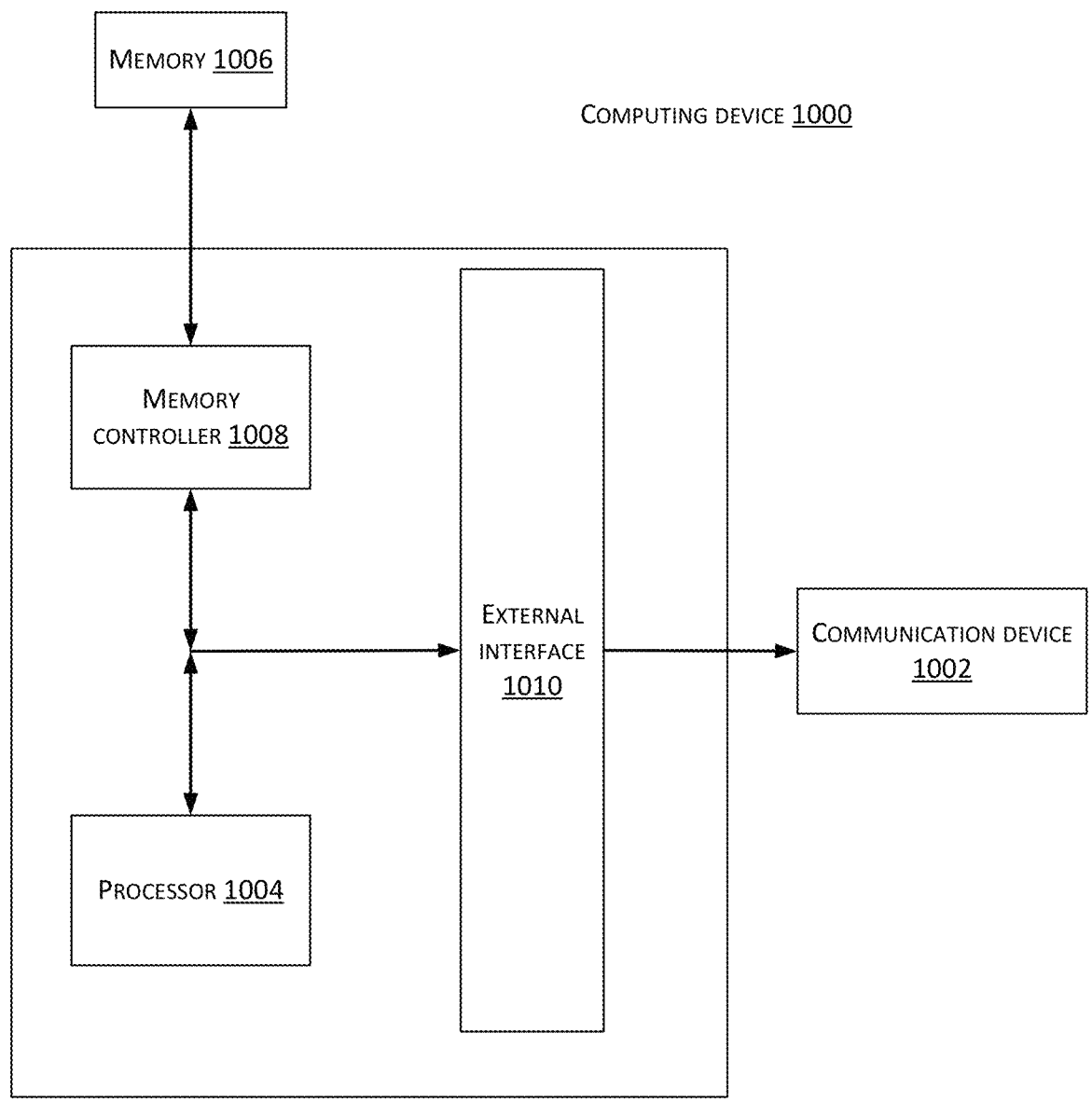
FIG. 10 is a schematic diagram of a computing device according to the embodiments of the present disclosure.

According to the embodiments of the present disclosure, an embodiment of a computing device for implementing the foregoing identity authentication methods is provided. FIG. 10 is a schematic diagram of a computing device 1000 according to the embodiments of the present disclosure. As shown in FIG. 10, the computing device 1000 includes a communication device 1002 and a processor 1004. In implementations, the computing device 1000 may also include a memory 1006, a memory controller 1008, and an external interface 1010.

The communication device 1002 establishes a communication connection with a control device, and is configured to receive identity information to be verified that is sent from the control device, wherein the control device is a device that is allowed to access the Internet.

The processor 1004 is connected to the communication device, and is configured to verify the identity information to be verified that is sent by the control device according to verification information, obtain a verification result, and generate a shared key used for data encryption and decryption if the verification result indicates that the identity information is trusted, wherein the shared key is used to ensure secure data transmission between the communication device and the control device.

In implementations, the computing device 1000 may be an Internet of Things device (such as a smart light, a smart air conditioner, etc.) in the Internet of Things edge computing, and the computing device cannot communicate with servers. A client application installed on a device (for example, a mobile phone) or a web-based Internet of Things application is used for operating an Internet of Things infrastructure device. The control device may be a networked device for controlling or operating a computing device, and may communicate with a server. The control device operates the computing device through an installed client application or a web-based application, and includes, but is not limited to, a mobile phone, a notebook Computers, tablets, computers, etc.

The computing device 1000 communicates with the control device through the communication device 1002. A communication protocol thereof includes, but is not limited to, any one of the following: a transmission control protocol (TCP), a user datagram protocol (UDP+, Bluetooth, Zigbee, and WiFi.

As can be seen from above, in the foregoing embodiments of the present disclosure, a first device that is allowed to access the Internet obtains encrypted information from the Internet, and uses the encrypted information to encrypt identity information of an account that the first device logs into the second device. As such, the second device may perform verification on the received identity information using verification information, and communicate with the first device only if determining that the identity information of the first device is trusted.

It is easy to note that the verification information in the second device can verify the encrypted information obtained by the first device to determine the identity of the first device according to the verification result. Therefore, through the solutions disclosed in the foregoing embodiments of the present disclosure, the purpose of verifying identity information of an object that is used for operating a non-networked device according to verification information built into the non-networked device is achieved. As such, a technical effect of authenticating an identity of a client by a non-networked device to improve the security of data transmission between the client and the non-networked device when the client is used to operate the non-networked device.

Therefore, the solutions of the foregoing embodiments provided by the present disclosure solve the problem of a networked device accessing a non-networked device failing to complete an identity authentication due to a failure of the non-networked device to connect to an authentication server during a process of operating the non-networked device by the networked device under the existing technologies.

Figure 11:
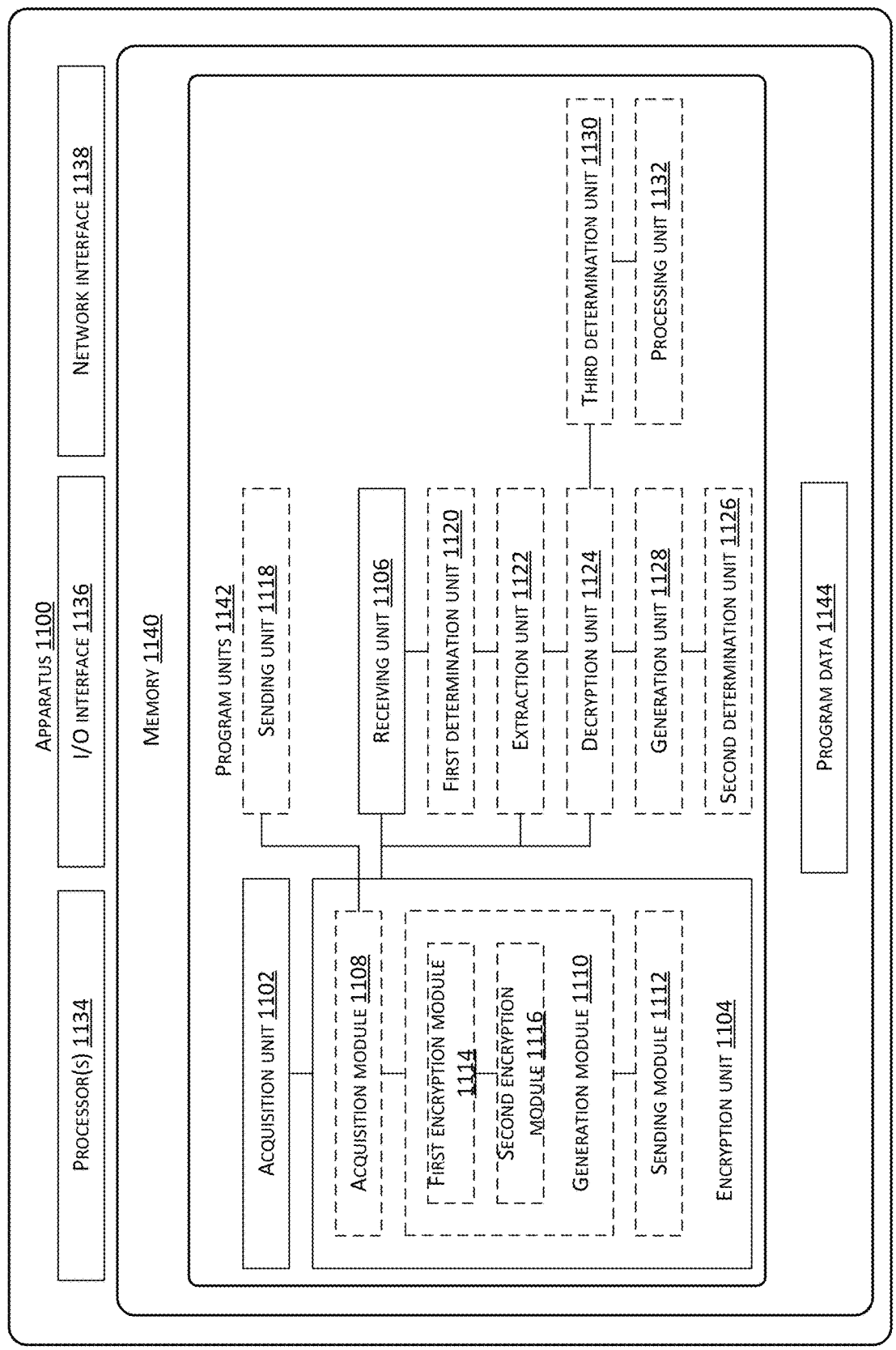
FIG. 11 is a schematic diagram of an identity authentication apparatus according to the embodiments of the present disclosure.

An apparatus for implementing the foregoing identity authentication methods is also provided according to the embodiments of the present disclosure. FIG. 11 is a schematic diagram of an identity authentication apparatus 1100 according to the embodiments of the present disclosure. As shown in FIG. 11, the apparatus 1100 includes an acquisition unit 1102, an encryption unit 1104, and a receiving unit 1106.

The acquisition unit 1102 is configured to establish a communication connection with a second device through a first device, and obtain encrypted information through the Internet, where the first device is a device that is allowed to access the Internet, and the second device is a device that is not allowed to access the Internet;

The encryption unit 1104 is configured to encrypt, by the first device, identity information of an account that is logged into the second device using the encrypted information, and send the encrypted identity information to the second device.

The receiving unit 1106 is configured to receive, by the first device, a verification result returned by the second device, wherein the second device verifies the encrypted identity information based on verification information.

It should be noted that the acquisition unit 1102, the encryption unit 1104, and the receiving unit 1106 correspond to steps S302 to S306 in the foregoing embodiments, and examples and application scenarios implemented by the foregoing units and/or modules are the same as those of the corresponding steps, but are not limited to the above content disclosed in the foregoing embodiments. It should be noted that the above modules, which act as a part of the apparatus, may be implemented in a computer system such as a set of computer executable instructions.

As can be seen from above, in the foregoing embodiments of the present disclosure, a first device that is allowed to access the Internet obtains encrypted information from the Internet, and uses the encrypted information to encrypt identity information of an account that the first device logs into a second device, so that the second device may verify the received identity information using verification information, and communicate with the first device only if the identity information of the first device is determined to be trusted.

It is easy to note that the verification information in the second device can be used to verify the encrypted information obtained by the first device, so that whether the identity of the first device is trusted can be determined according to the verification result. Therefore, through the solutions disclosed in the foregoing embodiments of the present disclosure, the purpose of verifying identity information of an object that is used for operating a non-networked device according to verification information built into the non-networked device is achieved. This thereby achieves a technical effect of improving the security of data transmission between a client and the non-networked device by authenticating an identity of the client by the non-networked device, when the client is used to operate the non-networked device.

Therefore, the solutions of the foregoing embodiments provided by the present disclosure solve the problem of failing to complete an identity authentication for a networked device that accesses a non-networked device due to a failure of the non-networked device to connect to an authentication server during a process of operating the non-networked device by the networked device under the existing technologies.

In implementations, the encryption unit 1104 includes: an acquisition module 1108 configured to obtain a login account, and receive encrypted information returned from an authentication server through the first device, wherein the encrypted information includes at least one of the following: a key pair and a digital certificate; a generation module 1110 configured to generate the encrypted identity information according to the login account and the encrypted information through the first device; and a sending module 1112 configured to send the encrypted identity information to the second device through the first device.

In implementations, the generation module 1110 includes: a first encryption module 1114 configured to encrypt the login account and/or a random number using the private key in the key pair through the first device to obtain an encryption result; and a second encryption module 1116 configured to generate, through the first device, the encrypted identity information based on the login account and information of at least one of the following: the encryption result and a digital certificate.

In implementations, the first encryption module 1114 is further configured to obtain the first random number through the first device, and encrypt the login account and the first random number using the private key in the key pair through the first device to obtain the encryption result.

In implementations, the apparatus 1100 further includes: a sending unit 1118 configured to initiate a login request to an authentication server through the first device, wherein the authentication server generates the encrypted information according to the login request, and the encrypted information includes at least one of the following: a key pair and a digital certificate.

In implementations, the first device establishes a communication connection with the second device using any one of the following communication modes: a transmission control protocol (TCP), a user datagram protocol (UDP), Bluetooth, Zigbee, and WiFi.

In implementations, the sending unit 1118 is further configured to add a digital signature of the first device to the encrypted identity information through the first device, and send the identity information added with the digital signature to the second device through the first device.

In implementations, the apparatus 1100 further includes: a first determination unit 1120 configured to determine whether the digital certificate included in the identity information to be verified is trusted according to a pre-installed root certificate through the second device, wherein the receiving unit 1106 is further configured to receives a result of identity verification failure returned by the second device through the first device when the digital certificate is not trusted.

In implementations, when the digital certificate is trusted, the apparatus 1100 further includes: an extraction unit 1122 configured to extract a public key included in the digital certificate through the second device if the digital certificate is trusted, and determine whether received data has been tampered with through the digital signature, wherein the receiving unit is further configured to receive a result of identity verification failure returned by the second device through the first device, if the received data has been tampered with.

In implementations, when the received data has not been tampered with, the apparatus 1100 further includes: a decryption unit 1124 configured to decrypt the encryption result using the public key through the second device to obtain the login account and/or the first random number; and a second determination unit 1126 configured to determine whether the login account exists in the trusted list through the second device, wherein the trusted list includes at least one account that is allowed to log into the second device, and the receiving unit 1106 is further configured to receive a result of identity verification failure returned by the second device through the first device when the login account does not exist in the trusted list.

In implementations, when the login account exists in the trusted list, the apparatus 1100 further includes: a generation unit 1128 configured to generate a shared key according to the first random number and a second random number returned by an authentication server through the first device, wherein the second random number is a random number generated by the second device when the login account exists in the trusted list, and the second device is configured generate the shared key according to the first random number and the second random number.

In implementations, the apparatus 1100 further includes a third determination unit 1130 configured to determine whether any login account exists in the trusted list through the second device; and a processing unit 1132 configured to cause the second device to use the decrypted login account as a management account and adds the management account to the trusted list, wherein the management account is used to manage at least one login account in the trusted list, when no login account exists in the trusted list.

In implementations, the apparatus 1100 may further include one or more processors 1134, an input/output (I/O) interface 1136, a network interface 1138, and memory 1140.

In implementations, the memory 1140 may include program units 1142 and program data 1144. The program units 1142 may include one or more of the foregoing units and/or modules as described in FIG. 11.

In implementations, the memory 1140 may include a form of computer readable media such as a volatile memory, a random access memory (RAM) and/or a non-volatile memory, for example, a read-only memory (ROM) or a flash RAM. The memory 1140 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The embodiments of the present disclosure may provide a computer terminal, which may be any computer terminal of a group of computer terminals. In implementations, the foregoing computer terminal may also be replaced with a terminal device such as a computer terminal.

In implementations, the computer terminal may be located in at least one access device of a plurality of network devices of a computer network.

Figure 12:
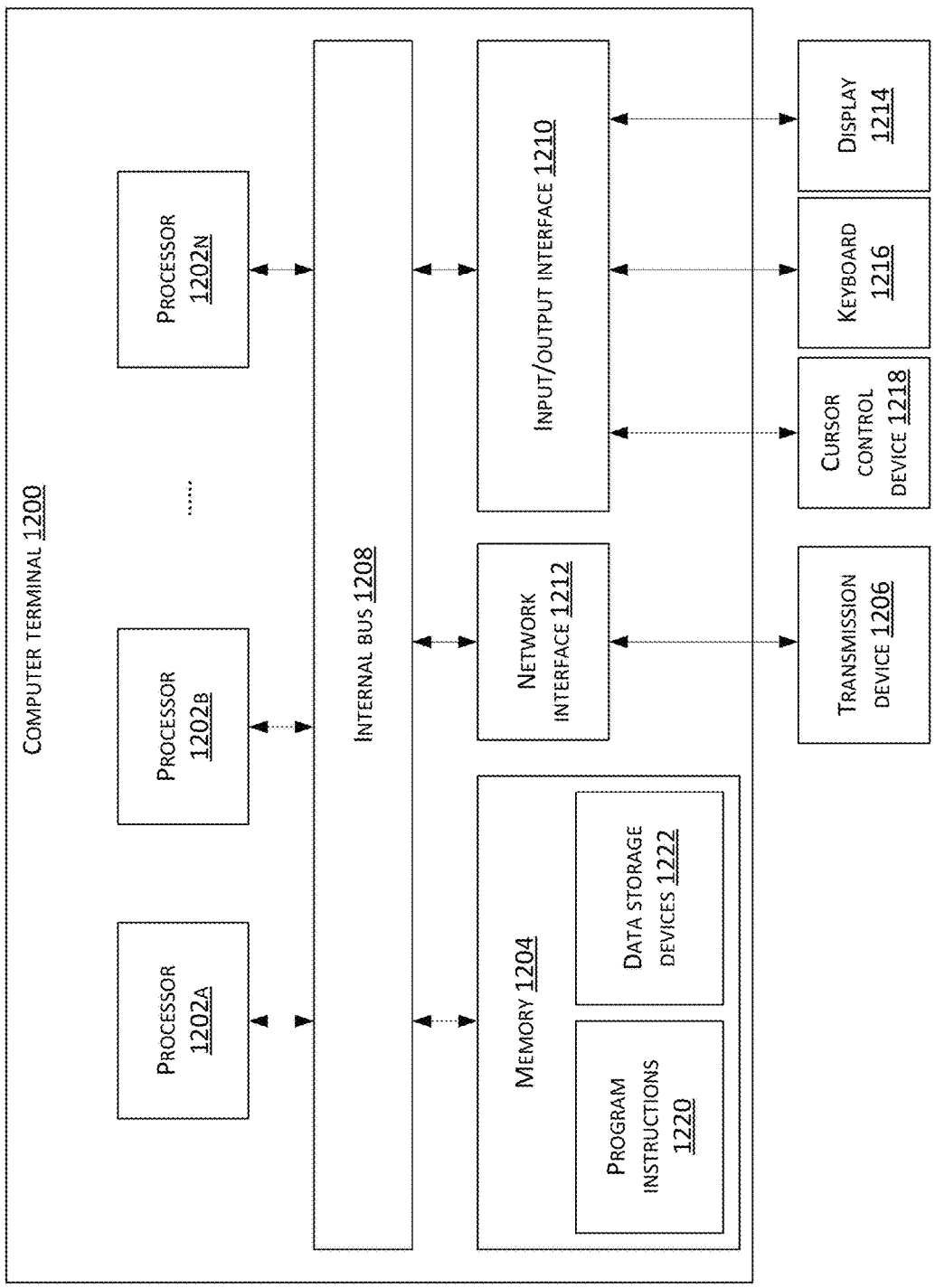
FIG. 12 is a block diagram showing a hardware configuration of a computer terminal according to the embodiments of the present disclosure.

FIG. 12 is a block diagram showing a hardware configuration of a computer terminal 1200. As shown in FIG. 12, a computer terminal 1200 may include one or more processors 1202, such as a processor 1202A, a processor 1202B, . . . , a processor 1202N, (the processor 1202 may include, but is not limited to, a processing device such as a microprocessor MCU or a programmable logic device FPGA), a memory 1204 used for storing data, and a transmission device 1206 used for communication functions. In addition, the computer terminal 1200 may further include an internal bus 1208, an input/output interface (I/O interface) 1210, a universal serial bus (USB) port (which can be included as one of the ports of the I/O interface), and a network interface 1212. Furthermore, in some implementations, the computer terminal 1200 may further include a display 1214, a keyboard 1216, and a cursor control device 1218. In implementations, the computer terminal 1200 may also include a power supply, and/or a camera. One skilled in the art can understand that the structure shown in FIG. 12 is merely illustrative, and does not limit the structure of the above electronic device. For example, the computer terminal 1200 may also include more or fewer components than the ones shown in FIG. 12, or have a configuration different from that shown in FIG. 12.

It should be noted that the one or more processors 1202 and/or other data processing circuits may be referred to herein generally as "data processing circuits". The data processing circuit may be embodied in whole or in part as software, hardware, firmware or any other combination. Moreover, the data processing circuitry can be a single and separate processing module, or incorporated in whole or in part into any of the other components in the computer terminal 1200. As involved in the embodiments of the present disclosure, the data processing circuit acts as a processor control (e.g., a selection of a variable resistance terminal path connected to the interface).

The memory 1204 can be used to store software programs and modules of application software, such as program instructions 1220 and/or data storage devices 1222 corresponding to the identity authentication methods in the embodiments of the present disclosure. The processor 1202 performs various functional applications and data processing by executing the software programs and modules stored in the memory 1204, i.e., implementing the identity authentication methods of the above applications. The memory 1204 may include high speed random access memory, and may also include non-volatile memory such as one or more magnetic storage devices, flash memory, or other non-volatile solid state memory. In some examples, the memory 1204 may further include storage devices remotely located relative to the processor 1202. These storage devices may be connected to the computer terminal 1200 via a network. Examples of such network include, but are not limited to, the Internet, an intranet, a local area network, a mobile communication network, and a combination thereof.

The transmission device 1206 is used for receiving or sending data via a network. Specific examples of the network described above may include a wireless network provided by a communication provider of the computer terminal 1200. In an example, the transmission device 1206 includes a network interface controller (NIC) that can be connected to other network devices through a base station to communicate with the Internet. In an example, the transmission device 1206 can be a radio frequency (RF) module used for communicating wirelessly with the Internet.

The display can be, for example, a liquid crystal display (LCD) with a touch screen that enables a user to interact with a user interface of the computer terminal 1200.

It should be noted that, in some exemplary embodiments, the computer terminal 1200 as shown in FIG. 12 above may include hardware components (which include circuits), software components (which include computer codes stored on a computer readable medium), or a combination of both hardware and software components. It should be noted that FIG. 12 is only one example of specific examples, and is intended to show types of components that may be present in the computer terminal 1200 as described above.

It should be noted here that in some embodiments, the computer terminal shown in FIG. 12 described above has a touch display (also referred to as a "touch screen" or a "touch display screen"). In some embodiments, the computer terminal shown in FIG. 12 has a graphical user interface (GUI), and a user can perform human-machine interactions with the GUI by making a finger contact and/or a gesture on a touch-sensitive surface. Functions of the human-machine interactions include the following interactions: creating web pages, drawing, word processing, creating electronic documents, games, video conferencing, instant messaging, emailing, calling interfaces, playing digital video, playing digital music, and/or web browsing, etc. Executable instructions that are used for performing the above functions of the human-computer interactions are configured or stored in one or more processor-executable computer program products or readable storage media.

In the present embodiment, the computer terminal 1200 may execute program codes of the following steps in an identity authentication method of an application program: a first device establishing a communication connection with a second device, and obtaining encrypted information through the Internet, where the first device is a device that is allowed to access the Internet, and the second device is a device that is not allowed to access the Internet; the first device encrypting identity information of an account that is logged into the second device by using the encrypted information, and sending the encrypted identity information to the second device; and the first device receiving a verification result that is returned by the second device, wherein the second device verifies the encrypted identity information based on verification information.

In implementations, the processor may further execute the following program codes: a first device establishing a communication connection with a second device, and obtaining encrypted information through the Internet, wherein the first device is a device that is allowed to access the Internet, and the second device is a device that is not allowed to access the Internet; the first device encrypting identity information of an account that is logged into the second device using the encrypted information, and sending the encrypted identity information to the second device; and the first device receiving a verification result returned by the second device, wherein the second device verifies the encrypted identity information based on verification information.

In implementations, the processor may further execute the following program codes: the first device obtaining a login account, and receiving encrypted information returned by an authentication server, wherein the encrypted information includes at least one of the following: a key pair and a digital certificate; the first device generating the encrypted identity information according to the login account and the encrypted information; the first device sending the encrypted identity information to the second device.

In implementations, the processor may further execute the following program codes: the first device encrypting the login account and/or a random number using a private key in the key pair to obtain an encryption result; and the first device generating the encrypted identity information based on the login account and information of at least one of the following: the encryption result and a digital certificate.

In implementations, the processor may further execute the following program codes: the first device obtaining a first random number; and the first device encrypting the login account and the first random number using a private key in the key pair to obtain the encryption result.

In implementations, the processor may further execute the following program codes: the first device initiating a login request to an authentication server, wherein the authentication server generates the encrypted information according to the login request, and the encrypted information includes at least one of the following: a key pair and a digital certificate.

In implementations, the first device establishes the communication connection with the second device using any one of the following communication modes: a transmission control protocol (TCP), a user datagram protocol (UDP), Bluetooth, Zigbee, and WiFi.

In implementations, the processor may further execute the following program codes: the first device adding a digital signature of the first device to the encrypted identity information; and the first device sending the identity information added with the digital signature to the second device.

In implementations, the processor may further execute the following program codes: the second device determining whether the digital certificate included in the identity information to be verified is trusted based on a pre-installed root certificate; and the first device receiving a result of the authentication failure returned by the second device if the digital certificate is not trusted.

In implementations, when the digital certificate is trusted, the processor may further execute the following program codes: the second device extracting a public key included in the digital certificate when the digital certificate is trusted, and verifying whether received data has been tampered with using the digital certificate; and the first device receiving a result of authentication failure returned by the second device if the received data has been tampered with.

In implementations, when the received data has not been tampered with, the processor may further execute the following program codes: the second device decrypting the encryption result using the public key to obtain the login account and/or the first random number; the second device determining whether the login account exists in a trusted list, wherein the trusted list includes at least one account that is allowed to log into the second device; and the first device receiving a result of authentication failure returned by the second device if the login account does not exist in the trusted list.

In implementations, when the login account exists in the trusted list, the processor may further execute the following program codes: the first device generating a shared key based on the first random number and a second random number returned by an authentication server, wherein the second random number is a random number generated by the second device when the login account exists in the trusted list, and the second device generates the shared secret key based on the first random number and the second random number.

In implementations, the processor may further execute the following program codes: the second device determining whether any login account exists in the trusted list; and the second device using the decrypted login account as a management account and adding the management account to the trusted list if no login account exists in the trusted list, wherein the management account is used to manage at least one login account in the trusted list.

One skilled in the art can understand that the structure shown in FIG. 12 is merely illustrative, and the computer terminal can also be a smart phone (such as an Android mobile phone, an iOS mobile phone, etc.), a tablet computer, a handheld computer, and a mobile Internet device (MID), a PAD and other terminal devices. FIG. 12 does not limit the structure of the above electronic device. For example, the computer terminal 1200 may also include more or fewer components (such as a network interface, a display device, etc.) than those shown in FIG. 12, or have a configuration different from that shown in FIG. 12.

One of ordinary skill in the art may understand that all or part of the steps of the foregoing embodiments may be completed by a program to instruct related hardware of a terminal device. The program may be stored in a computer readable storage medium. The storage medium may include a flash drive, read-only memory (ROM), random access memory (RAM), a magnetic disk, or an optical disk.

The embodiments of the present disclosure also provide a storage medium. In implementations, the storage medium may be configured to store program codes executed by the identity authentication methods provided by the foregoing embodiments. A device in which the storage medium is located is controlled to execute any one of the identity authentication methods in the exemplary embodiments.

In implementations, the storage medium may be located in any mobile terminal of a group of mobile terminals in a computer network, or located in any mobile terminal of a group of mobile terminals.

In implementations, the storage medium is configured to store program codes for performing the following steps: a first device establishing a communication connection with a second device, and obtaining encrypted information through the Internet, wherein the first device is a device that is allowed to access the Internet, and the second device is a device that is not allowed to access the Internet; the first device encrypting identity information of an account that is logged into the second device using the encrypted information, and sending the encrypted identity information to the second device; and the first device receiving a verification result returned by the second device, wherein the second device verifies the encrypted identity information based on verification information.

In implementations, the storage medium is configured to store program codes for performing the following steps: the first device obtaining a login account, and receiving encrypted information returned by an authentication server, wherein the encrypted information includes at least one of the following: a key pair and a digital certificate; the first device generating the encrypted identity information according to the login account and the encrypted information; the first device sending the encrypted identity information to the second device.

In implementations, the storage medium is configured to store program codes for performing the following steps: the first device encrypting the login account and/or a random number using a private key in the key pair to obtain an encryption result; and the first device generating the encrypted identity information based on the login account and information of at least one of the following: the encryption result and a digital certificate.

In implementations, the storage medium is configured to store program codes for performing the following steps: the first device obtaining a first random number; and the first device encrypting the login account and the first random number using a private key in the key pair to obtain the encryption result.

In implementations, the storage medium is configured to store program codes for performing the following steps: the first device initiating a login request to an authentication server, wherein the authentication server generates the encrypted information according to the login request, and the encrypted information includes at least one of the following: a key pair and a digital certificate.

In implementations, the first device establishes the communication connection with the second device using any one of the following communication modes: a transmission control protocol (TCP), a user datagram protocol (UDP), Bluetooth, Zigbee, and WiFi.

In implementations, the storage medium is configured to store program codes for performing the following steps: the first device adding a digital signature of the first device to the encrypted identity information; and the first device sending the identity information added with the digital signature to the second device.

In implementations, the storage medium is configured to store program codes for performing the following steps: the second device determining whether the digital certificate included in the identity information to be verified is trusted based on a pre-installed root certificate; and the first device receiving a result of the authentication failure returned by the second device if the digital certificate is not trusted.

In implementations, when the digital certificate is trusted, the storage medium is configured to store program codes for performing the following steps: the second device extracting a public key included in the digital certificate when the digital certificate is trusted, and verifying whether received data has been tampered with using the digital certificate; and the first device receiving a result of authentication failure returned by the second device if the received data has been tampered with.

In implementations, when the received data has not been tampered with, the storage medium is configured to store program codes for performing the following steps: the second device decrypting the encryption result using the public key to obtain the login account and/or the first random number; the second device determining whether the login account exists in a trusted list, wherein the trusted list includes at least one account that is allowed to log into the second device; and the first device receiving a result of authentication failure returned by the second device if the login account does not exist in the trusted list.

In implementations, when the login account exists in the trusted list, the storage medium is configured to store program codes for performing the following steps: the first device generating a shared key based on the first random number and a second random number returned by an authentication server, wherein the second random number is a random number generated by the second device when the login account exists in the trusted list, and the second device generates the shared secret key based on the first random number and the second random number.

In implementations, the storage medium is configured to store program codes for performing the following steps: the second device determining whether any login account exists in the trusted list; and the second device using the decrypted login account as a management account and adding the management account to the trusted list if no login account exists in the trusted list, wherein the management account is used to manage at least one login account in the trusted list.

The embodiments of the present disclosure further provide an identity authentication system, which includes: a processor; and a memory coupled to the processor and configured to provide instructions to the processor to process the following processing steps:

a first device establishing a communication connection with a second device, and obtaining encrypted information through the Internet, wherein the first device is a device that is allowed to access the Internet, and the second device is a device that is not allowed to access the Internet;

the first device encrypting identity information of an account that is logged into the second device using the encrypted information, and sending the encrypted identity information to the second device; and the first device receiving a verification result returned by the second device, wherein the second device verifies the encrypted identity information based on verification information.

As can be seen from above, in the foregoing embodiments of the present disclosure, a first device that is allowed to access the Internet obtains encrypted information from the Internet, and uses the encrypted information to encrypt identity information of an account of the first device that is logged into the second device, so that the second device may verify the received identity information using verification information, and communicate with the first device upon determining that the identity information of the first device is trusted.

It is easy to note that the verification information in the second device can be used to verify the encrypted information obtained by the first device, so that whether the identity of the first device is trusted can be determined according to the verification result. Therefore, through the solutions disclosed in the foregoing embodiments of the present disclosure, the purpose of verifying identity information of an object that is used for operating a non-networked device according to verification information built into the non-networked device is achieved. This thereby achieves a technical effect of improving the security of data transmission between a client and the non-networked device by authenticating an identity of the client by the non-networked device, when the client is used to operate the non-networked device.

Therefore, the solutions of the foregoing embodiments provided by the present disclosure solve the problem of failing to complete an identity authentication for a networked device that accesses a non-networked device due to a failure of the non-networked device to connect to an authentication server during a process of operating the non-networked device by the networked device under the existing technologies.

Serial numbers of the embodiments of the present disclosure are merely used for description, and do not represent the advantages and disadvantages of the embodiments.

In the foregoing embodiments of the present disclosure, the descriptions of various embodiments are different, and the parts that are not detailed in a certain embodiment can be referred to related descriptions of other embodiments.

In a number of embodiments provided by the present disclosure, it should be understood that the disclosed technical content may be implemented in other manners. The apparatus embodiments described above are merely illustrative. For example, a division of units is only a division of logical functions. In practical implementations, other manners of division may exist. For example, multiple units or components may be combined or may be integrated into another system, or some features may be ignored or not executed. In addition, a mutual coupling, direct coupling, or communication connection that is shown or discussed may be an indirect coupling or communication connection through some interface, unit or module, and may be in an electrical or other form.

The units described as separate components may or may not be physically separated. The components displayed as units may or may not be physical units, i.e., may be located in one place, or may be distributed among multiple network units. Some or all of the units may be selected according to actual needs to achieve the purpose of the solutions of the embodiments.

In addition, various functional units in various embodiments of the present disclosure may be integrated into a single processing unit. Alternatively, each unit may exist physically and separately. Alternatively, two or more units may be integrated into a single unit. The above integrated unit can be implemented in a form of hardware or in a form of a software functional unit.

If implemented in a form of a software functional unit and sold or used as a standalone product, the integrated unit may be stored in a computer readable storage medium. Based on such understanding, the essence of the technical solutions of the present disclosure, or the parts that make contribution to the existing technologies, or all or part of the technical solutions may be embodied in a form of a software product. The computer software product is stored in a storage medium, and includes a number of instructions for causing a computing device (which may be a personal computer, a server, or a network device, etc.) to perform all or part of the steps of the methods described in various embodiments of the present disclosure. The storage medium includes: a U disk, a Read-Only Memory (ROM), a Random Access Memory (RAM), a removable hard disk, a magnetic disk, or an optical disk, and the like.

The above description corresponds to exemplary embodiments of the present disclosure only. For one skilled in the art, a number of improvements and polishing can be made without departing from the principles of the present disclosure. These improvements and polishing should be considered to be under the scope of protection of the present disclosure.

The present disclosure can be further be understood using the following clauses.

Clause 1: An identity authentication system comprising: a first device that is configured to obtain encrypted information through the Internet, encrypt identity information of an account that is logged into a second device by using the encrypted information, and sending the encrypted identity information to the second device; the second device that establishes a communication connection with the first device, and is configured to verify the encrypted identity information based on verification information, obtain a verification result, and return the verification result to the first device, wherein the first device is a device that is allowed to access the Internet, and the second device is a device that is not allowed to access the Internet.

Clause 2: The system of Clause 1, further comprising: a server that communicates with the first device, and is configured to receive a login request initiated by the first device, and generate the encrypted information according to the login request, wherein the encrypted information includes at least one of: a key pair and a digital certificate.

Clause 3: An identity authentication method comprising: a first device establishing a communication connection with a second device, and obtaining encrypted information through the Internet, wherein the first device is a device that is allowed to access the Internet, and the second device is a device that is not allowed to access the Internet; the first device encrypting identity information of an account that is logged into the second device using the encrypted information, and sending the encrypted identity information to the second device; and the first device receiving a verification result returned by the second device, wherein the second device verifies the encrypted identity information based on verification information.

Clause 4: The method of Clause 3, wherein the first device encrypting the identity information of the account that is logged into the second device using the encrypted information, and sending the encrypted identity information to the second device comprise: the first device obtaining a login account, and receiving the encrypted information returned by an authentication server, wherein the encrypted information includes at least one of the following: a key pair and a digital certificate; the first device generating the encrypted identity information according to the login account and the encrypted information; and the first device sending the encrypted identity information to the second device.

Clause 5: The method of Clause 4, wherein the first device generating the encrypted identity information according to the login account and the encrypted information comprises: the first device encrypting the login account and/or a random number using a private key in the key pair to obtain an encryption result; and the first device generating the encrypted identity information based on the login account and information of at least one of: the encryption result and a digital certificate.

Clause 6: The method of Clause 5, wherein the first device encrypting the login account and/or the random number using the private key in the key pair to obtain the encryption result comprises: the first device obtaining a first random number; and the first device encrypting the login account and the first random number using the private key in the key pair to obtain the encryption result.

Clause 7: The method of Clause 3, wherein: before the first device encrypting the identity information of the account that is logged into the second device using the encrypted information, and sending the encrypted identity information to the second device, the method further comprises: the first device initiating a login request to an authentication server, wherein the authentication server generates the encrypted information according to the login request, and the encrypted information includes at least one of: a key pair and a digital certificate.

Clause 8: The method of Clause 3, wherein the first device establishes the communication connection with the second device using any one of the following communication modes: a transmission control protocol (TCP), a user datagram protocol (UDP), Bluetooth, Zigbee, and WiFi.

Clause 9: The method of Clause 6, wherein the first device sending the encrypted identity information to the second device comprises: the first device adding a digital signature of the first device to the encrypted identity information; and the first device sending the identity information added with the digital signature to the second device.

Clause 10: The method of Clause 9, wherein: after the first device sending the identity information added with the digital signature to the second device, the method further comprises: the second device determining whether the digital certificate included in the identity information to be verified is trusted based on a pre-installed root certificate; and the first device receiving a result of the authentication failure returned by the second device if the digital certificate is not trusted.

Clause 11: The method of Clause 10, wherein: when the digital certificate is trusted, the method further comprises: the second device extracting a public key included in the digital certificate when the digital certificate is trusted, and verifying whether received data has been tampered with using the digital certificate; and the first device receiving a result of authentication failure returned by the second device if the received data has been tampered with.

Clause 12: The method of Clause 11, wherein: when the received data has not been tampered with, the method further comprises: the second device decrypting the encryption result using the public key to obtain the login account and/or the first random number; the second device determining whether the login account exists in a trusted list, wherein the trusted list includes at least one account that is allowed to log into the second device; and the first device receiving a result of authentication failure returned by the second device if the login account does not exist in the trusted list.

Clause 13: The method of Clause 12, wherein: when the login account exists in the trusted list, the method further comprises: the first device generating a shared key based on the first random number and a second random number returned by an authentication server, wherein the second random number is a random number generated by the second device when the login account exists in the trusted list, and the second device generates the shared secret key based on the first random number and the second random number.

Clause 14: The method of Clause 12, further comprising: the second device determining whether any login account exists in the trusted list; and the second device using the decrypted login account as a management account and adding the management account to the trusted list if no login account exists in the trusted list, wherein the management account is used to manage at least one login account in the trusted list.

Clause 15: An identity authentication method comprising: a second device establishing a communication connection with the first device, and receiving identity information to be verified that is sent by the first device, wherein the first device is a device that is allowed to access the Internet, and the second device is a device that is not allowed to access the Internet; and the second device verifying the identity information to be verified that is sent by the first device based on verification information, and obtaining a verification result, wherein the identity information to be verified is data that is encrypted using encrypted information.

Clause 16: An identity authentication method comprising: a second device receiving identity information to be verified that is sent from a first device, wherein the first device is a device that is allowed to access the Internet, and the second device is a device that is not allowed to access the Internet; the second device verifying the identity information to be verified according to verification information to obtain a verification result; and generating a shared key used for encrypting and decrypting data in response to the verification result indicating that the identity information is trusted, wherein the shared key is used for ensuring secure data transmission between the first device and the second device, and the identity information to be verified is data encrypted by using encrypted information.

Clause 17: The method of Clause 16, wherein: before the second device receiving the identity information to be verified that is sent from the first device, the method further comprises: the first device obtaining a login account, and receiving the encrypted information returned by an authentication server, wherein the encrypted information includes at least one of the following: a key pair and a digital certificate; the first device generating the encrypted identity information according to the login account and the encrypted information; and the first device sending the encrypted identity information to the second device.

Clause 18: The method of Clause 17, wherein the second device receives the identity information to be verified that is sent from the first device by using one of the following communication modes: a transmission control protocol (TCP), a user datagram protocol (UDP), Bluetooth, Zigbee, and WiFi.

Clause 19: The method of Clause 17, wherein before the first device obtains the login account, and receives the encrypted information returned by the authentication server, the method further comprises: the first device initiating a login request to an authentication server, wherein the authentication server generates the encrypted information according to the login request.

Clause 20: The method of Clause 17, wherein the first device generating the encrypted identity information according to the login account and the encrypted information comprises: the first device encrypting the login account and/or a random number using a private key in the key pair to obtain an encryption result; and the first device generating the encrypted identity information based on the login account and information of at least one of: the encryption result and a digital certificate.

Clause 21: The method of Clause 20, wherein the first device encrypting the login account and/or the random number using the private key in the key pair to obtain the encryption result comprises: the first device obtaining a first random number; and the first device encrypting the login account and the first random number using the private key in the key pair to obtain the encryption result.

Clause 22: The method of Clause 21, wherein the first device sending the encrypted identity information to the second device comprises: the first device adding a digital signature of the first device to the encrypted identity information; and the first device sending the identity information added with the digital signature to the second device.

Clause 23: The method of Clause 22, wherein the second device verifying the identity information to be verified according to verification information to obtain the verification result comprises: the second device determining whether the digital certificate included in the identity information to be verified is trusted based on a pre-installed root certificate; and the first device receiving a result of the authentication failure returned by the second device if the digital certificate is not trusted.

Clause 24: The method of Clause 23, wherein: when the digital certificate is trusted, the method further comprises: the second device extracting a public key included in the digital certificate when the digital certificate is trusted, and verifying whether received data has been tampered with using the digital certificate; and the first device receiving a result of authentication failure returned by the second device if the received data has been tampered with.

Clause 25: The method of Clause 24, wherein: when the received data has not been tampered with, the method further comprises: the second device decrypting the encryption result using the public key to obtain the login account and/or the first random number; the second device determining whether the login account exists in a trusted list, wherein the trusted list includes at least one account that is allowed to log into the second device; and the first device receiving a result of authentication failure returned by the second device if the login account does not exist in the trusted list.

Clause 26: The method of Clause 25, wherein the second device determines the verification result as the identity information of the first device being trusted when the login account exists in the trusted list.

Clause 27: The method of Clause 26, wherein: after the second device determining the verification result as the identity information of the first device being trusted when the login account exists in the trusted list, the method further comprises: the second device obtaining a second random number, and generating a shared secret key based on the first random number and the second random number, wherein the first device generates the shared key based on the first random number and the second random number returned by an authentication server.

Clause 28: The method of Clause 25, wherein: after the second device decrypts the encryption result using the public key to obtain the login account and/or the first random number, the method further comprises: the second device determining whether any login account exists in the trusted list; and the second device using the decrypted login account as a management account and adding the management account to the trusted list if no login account exists in the trusted list, wherein the management account is used to manage at least one login account in the trusted list.

Clause 29: A computing device comprising: a communication apparatus, which establishes a communication connection with a control device, and is configured to receive identity information to be verified that is sent from the control device, wherein the control device a device that is allowed to access the Internet; and a processor which is connected to the communication device, and is configured to obtain a verification result by verifying the identity information to be verified that is sent from the control device based on verification information, and generate a shared key for data encryption and decryption if the verification result indicates that the identity information is trusted, wherein the shared key is used for ensuring secure data transmission between the communication device and the control device.

Clause 30: A storage medium comprising a stored program, wherein the program, when executed, controls a device in which the storage medium is located to perform the identity authentication method of any one of Clauses 3-14.

Clause 31: A computer terminal comprising: a processor configured to execute a program, wherein the program, when executed, performs the identity authentication method of any one of Clauses 3-14.

Clause 32: An identity authentication system comprising: a processor; and a memory coupled to the processor and configured to provide an instruction to the processor to process the following processing steps: a first device establishing a communication connection with a second device and obtaining encrypted information through the Internet, wherein the first device is a device that is allowed to access the Internet, and the second device is a device that is not allowed to access the Internet; the first device encrypting identity information of an account that is logged into the second device using the encrypted information, and sending the encrypted identity information to the second device; and the first device receiving a verification result that is returned by the second device, wherein the second device verifies the encrypted identity information based on verification information.

What is claimed is:

1. A method implemented by a first device, the method comprising:
sending a login request initiated at the first device to an authentication server over the Internet, the login request comprising a login account;
establishing a communication connection with a second device, and obtaining encrypted information through the Internet in response to the login request, wherein the first device is a device that is allowed to access the Internet, and the second device is a device that is not allowed to access the Internet;
encrypting identity information of a user account that is logged into the second device using the encrypted information, and sending the encrypted identity information to the second device, wherein the user account has a one-to-one correspondence with the login account; and
receiving a verification result returned by the second device, wherein the second device verifies the encrypted identity information based on:
decrypting, by the second device, the encrypted identity information using a public key extracted from a digital certificate included in the identity information; and
determining, by the second device, whether the login account of the login request exists in a trusted list, wherein the trusted list includes at least one user account that is allowed to log into the second device.

2. The method of claim 1, wherein encrypting the identity information of the user account that is logged into the second device using the encrypted information, and sending the encrypted identity information to the second device comprise:
   obtaining the login account, and receiving the encrypted information returned by an authentication server, wherein the encrypted information includes at least one of the following: a key pair and a digital certificate;
   generating the encrypted identity information according to the login account and the encrypted information; and
   sending the encrypted identity information to the second device.

3. The method of claim 2, wherein generating the encrypted identity information according to the login account and the encrypted information comprises:
   encrypting the login account and/or a random number using a private key in the key pair to obtain an encryption result; and
   generating the encrypted identity information based on the login account and information of at least one of: the encryption result and a digital certificate.

4. The method of claim 3, wherein encrypting the login account and/or the random number using the private key in the key pair to obtain the encryption result comprises:
   obtaining a first random number; and
   encrypting the login account and the first random number using the private key in the key pair to obtain the encryption result.

5. The method of claim 1, wherein the authentication server generates the encrypted information according to the login request, and the encrypted information includes at least one of: a key pair and a digital certificate.

6. The method of claim 1, wherein establishing the communication connection with the second device is performed using one of: a transmission control protocol (TCP), a user datagram protocol (UDP), Bluetooth, Zigbee, and WiFi.

7. The method of claim 1, wherein sending the encrypted identity information to the second device comprises:
   adding a digital signature of the first device to the encrypted identity information; and
   sending the identity information added with the digital signature to the second device.

8. The method of claim 7, further comprising:
   after the first device sending the identity information added with the digital signature to the second device, receiving a result of the authentication failure returned by the second device if the digital certificate is determined to be not trusted by the second device, wherein sending the identity information added with the digital signature to the second device enables the second device to determine whether the digital certificate included in the identity information to be verified is trusted based on a pre-installed root certificate.

9. The method of claim 1, further comprising:
   obtaining a login account, and receiving encrypted information returned by an authentication server;
   generating the encrypted identity information according to the login account and the encrypted information;
   sending the encrypted identity information to the second device; and
   generating a shared key based on a first random number generated by the first device and a second random number returned by the authentication server, wherein the second random number is a random number generated by the second device when the login account exists in the trusted list, and the second device generates the shared secret key based on the first random number and the second random number.

10. One or more computer readable media storing executable instructions that, when executed by one or more processors of a second device, cause the one or more processors to perform acts comprising:
   receiving encrypted identity information to be verified that is sent from a first device, wherein the identity information comprises a user account logged into the second device having a one-to-one correspondence with a login account of login request initiated at the first device, the first device is a device that is allowed to access the Internet, and the second device is a device that is not allowed to access the Internet;
   decrypting the encrypted identity information using a public key extracted from a digital certificate included in the identity information;
   verifying the identity information to be verified according to verification information to obtain a verification result by determining whether the login account of the login request exists in a trusted list, wherein the trusted list includes at least one user account that is allowed to log into the second device; and
   generating a shared key used for encrypting and decrypting data in response to the verification result indicating that the identity information is trusted, wherein the shared key is used for ensuring secure data transmission between the first device and the second device, and the identity information to be verified is data encrypted by using encrypted information.

11. The one or more computer readable media of claim 10, wherein the identity information to be verified that is sent from the first device is received by using one of: a transmission control protocol (TCP), a user datagram protocol (UDP), Bluetooth, Zigbee, and WiFi.

12. The one or more computer readable media of claim 10, wherein verifying the identity information to be verified according to verification information to obtain the verification result comprises:
   determining whether the digital certificate included in the identity information to be verified is trusted based on a pre-installed root certificate; and
   returning a result of the authentication failure to the first device if the digital certificate is not trusted.

13. The one or more computer readable media of claim 12, wherein the acts further comprise:
   extracting the public key included in the digital certificate when the digital certificate is trusted, and verifying whether received data has been tampered with using the digital certificate; and
   returning the result of the authentication failure to the first device if the received data has been tampered with.

14. The one or more computer readable media of claim 13, wherein the acts further comprise:
   returning the result of the authentication failure to the first device if the login account does not exist in the trusted list.

15. The one or more computer readable media of claim 14, wherein the acts further comprise determining the verification result as the identity information of the first device being trusted when the login account exists in the trusted list.

16. The one or more computer readable media of claim 15, wherein the acts further comprise:
   obtaining a second random number, and generating a shared secret key based on the first random number and the second random number, after determining the verification result as the identity information of the first device being trusted when the login account exists in the trusted list, wherein the first device generates the shared key based on the first random number and the second random number returned by an authentication server.

17. The one or more computer readable media of claim 14, wherein: after decrypting the encryption result using the public key to obtain the login account and/or the first random number, the acts further comprise:
   determining whether any login account exists in the trusted list; and
   using the decrypted login account as a management account and adding the management account to the trusted list if no login account exists in the trusted list, wherein the management account is used to manage at least one login account in the trusted list.

18. A first device comprising:
   one or more processors; and
   memory storing executable instructions that, when executed by the one or more processors, cause the one or more processors to perform acts comprising:
   sending a login request initiated at the first device to an authentication server over the Internet, the login request comprising a login account;
   establishing a communication connection with a second device and obtaining encrypted information through the Internet in response to the login request, wherein the first device is a device that is allowed to access the Internet, and the second device is a device that is not allowed to access the Internet;
   encrypting identity information of a user account that is logged into the second device using the encrypted information, and sending the encrypted identity information to the second device, wherein the user account has a one-to-one correspondence with the login account; and
   receiving a verification result that is returned by the second device, wherein the second device verifies the encrypted identity information based on:
      decrypting, by the second device, the encrypted identity information using a public key extracted from a digital certificate included in the identity information; and
      determining, by the second device, whether the login account of the login request exists in a trusted list, wherein the trusted list includes at least one user account that is allowed to log into the second device.

19. The first device of claim 18, wherein encrypting the identity information of the user account that is logged into the second device using the encrypted information, and sending the encrypted identity information to the second device comprise:
   obtaining a login account, and receiving the encrypted information returned by an authentication server, wherein the encrypted information includes at least one of the following: a key pair and a digital certificate;
   generating the encrypted identity information according to the login account and the encrypted information; and
   sending the encrypted identity information to the second device.

20. The first device of claim 19, wherein generating the encrypted identity information according to the login account and the encrypted information comprises:
   encrypting the login account and/or a random number using a private key in the key pair to obtain an encryption result; and
   generating the encrypted identity information based on the login account and information of at least one of: the encryption result and a digital certificate.

* * * * *